United States Patent [19]

Gingrich

[11] 4,220,221
[45] Sep. 2, 1980

[54] METHOD AND APPARATUS FOR PRODUCING A SPEED PATTERN FOR AN ELEVATOR CAR OR SIMILAR VEHICLE

[75] Inventor: John A. Gingrich, Toronto, Canada

[73] Assignees: Dover Corporation, New York, N.Y.; Dover Corporation (Canada) Limited, Toronto, Canada

[21] Appl. No.: 764,712

[22] Filed: Feb. 2, 1977

[51] Int. Cl.² ............................................. B66B 1/30
[52] U.S. Cl. ............................................. 187/29 R
[58] Field of Search ........................................ 187/29

[56] References Cited

U.S. PATENT DOCUMENTS

| | | | |
|---|---|---|---|
| 3,589,474 | 6/1971 | Wavre | 187/29 |
| 3,670,851 | 6/1972 | Shima | 187/29 |
| 3,747,710 | 7/1973 | Winkler | 187/29 |
| 3,777,855 | 12/1973 | Boyldew et al. | 187/29 |
| 3,893,695 | 7/1975 | Rickert | 187/29 X |
| 4,102,436 | 7/1978 | Kernick et al. | 187/29 |

Primary Examiner—J. V. Truhe
Assistant Examiner—W. E. Duncanson, Jr.

Attorney, Agent, or Firm—Brumbaugh, Graves, Donohue & Raymond

[57] ABSTRACT

A system for producing a velocity pattern for a vehicle such as an elevator car which must be brought smoothly to a stop accurately aligned with a desired one of a number of stations. The distance between the vehicle and the station at which a stop is required (target distance) is expressed in digital form, and is processed electronically to produce a velocity pattern which results in constant deceleration of the vehicle during the entire approach except for an initial build-up to, and a final tapering off from, the constant deceleration. A single adjustment for deceleration rate automatically adjusts the slowdown distance to the correct value to suit the selected deceleration rate. The calculation is done repetitively at high speed to minimize any lag between the diminishing target distance and the corresponding velocity pattern. Further adjustments permit control of the final tapering off from constant deceleration, with the slowdown distance automatically adjusted to suit these adjustments also.

57 Claims, 17 Drawing Figures

METHOD AND APPARATUS FOR PRODUCING A SPEED PATTERN FOR AN ELEVATOR CAR OR SIMILAR VEHICLE

The present invention relates to vehicle control systems generally and, more particularly, to a system (i.e., method and apparatus) for producing a velocity pattern for an elevator car or similar vehicle which must be brought smoothly to a stop accurately aligned with a desired one of a number of stations.

While the present invention is primarily intended for, and has been developed for use with elevator control systems, its principles are not limited to the elevator environment. As will be understood from the discussion below, the present invention has general applicability whenever it is necessary to produce a speed pattern signal for a vehicle, such as an elevator car, railroad car or any other movable conveyance, that is arranged to move between two or more stopping positions or stations.

In transportation systems with automatic control, a vehicle must be capable of stopping at an accurately aligned position coinciding with any one of various stations where passengers or goods can enter or leave the vehicle. A stopping sequence may be initiated after the vehicle has attained its maximum speed, or it may be initiated while the vehicle is still accelerating towards maximum speed. This latter case is particularly common in passenger elevators where the distance required to accelerate to full speed and then come to a stop is greater than the distance between adjacent stations.

It is obviously desirable to delay any stopping sequence as long as possible so as to not waste time running at a lower speed than necessary, and to avoid creeping towards the station at low speed. It is equally obvious that if a stopping sequence is delayed too long, an excessive rate of deceleration is required which could be beyond the capability of the equipment or too uncomfortable for the passengers.

The usual method for achieving good stopping performance for such transportation systems is to have the velocity of the vehicle controlled in accordance with the distance, which can be conveniently called the "target distance", between the vehicle and the station at which a stop is being made. When the vehicle is far enough away from this station, maximum speed is permitted, but as the vehicle approaches closer and closer to the station, progressively lower speeds are called for. When the vehicle is running at maximum speed without a selected station stop, or if the selected stop is farther away than the stopping distance of the vehicle, the target distance may be set at a predetermined value that is equal to or greater than this stopping distance.

In the case of an elevator car travelling in a hoistway, the target distance may be defined as the distance between the car and the so-called "target floor", which is a well-recognized concept in the elevator art and as described, for example, in my U.S. Pat. No. 3,407,905. It will be appreciated that the target distance may be calculated in many ways, however, depending upon the particular transportation system involved.

For an ideal slowdown, where the vehicle has constant deceleration during most of the stopping sequence, the relationship between velocity and target distance is unfortunately not linear. Instead, since the distance a vehicle travels is proportional portional to the integral of its velocity over time, the velocity must be made proportional to the square root of a distance which is equal to the target distance less a constant. This constant is required to compensate for the rounding-off at the end of the stopping sequence where the deceleration is reduced to zero. The maintaining of the constant deceleration right down to zero velocity would, of course, theoretically result in an infinite rate of change of association (sometimes called "bump" or "jerk") at the instant of stopping: a condition which would be objectionable to passengers.

During the final rounding-off, the relationship between velocity and target distance is no longer a square root. Ideally the velocity should be parabolic with respect to time and this requires the velocity to be made proportional to the cube root of the target distance squared. However, good results can be obtained by making the velocity directly proportional to the target distance. This relationship theoretically produces exponential rounding-off, but in practice the response of the system is such as to make it quite acceptable and not much different than the ideal parabolic rounding-off.

For elevators, a common practice for many years has been to reproduce the car motion, to some suitable scale, on a mechanical device known as a selector. Examples of such selectors can be found in the U.S. Pat. Nos. 2,074,578 to E. L. Dunn et al and 2,657,765 to C. Savage. On these selectors, the target distance is represented by the displacement between two parts of the selector. Electrical contacts operated by this displacement are caused to operate in sequence as the target distance decreases during a stopping sequence. These contacts usually feed relays whose contacts control the magnitude of field current in the generator of a motor-generator set, and the generator armature supplies direct current to the hoist motor. The motor speed is thus reduced in a series of steps. By adjusting the values of target distance at which the steps occur, and by adjusting the corresponding reduction in generator field current, any desired relationship between velocity and target distance can be obtained.

When the mechanical selector is replaced by a solid state system, the target distance is obtained electronically and is usually expressed in digital form by low voltage signals on one or more wires. One system for determining the target distance electronically is disclosed in my co-pending patent application Ser. No. 728,006 filed Sept. 29, 1976 the subject matter of which is incorporated herein by reference; another system is disclosed in the U.S. Pat. No. 3,773,146 to Dixon, Jr. et al.

Further circuits are required to establish a velocity pattern, preferably an analog signal, which has the correct relationship to the target distance. Various speed control schemes are available to force the motor speed to obey the dictation from an analog signal. An example of such a system is disclosed in my U.S. Pat. No. 3,706,017. Alternatively, the velocity pattern could be expressed by a series of relays, driven by the solid state circuit output, which correspond to the relays which would otherwise be driven from the target distance as determined by a mechanical selector.

In accordance with the present invention there is provided a novel and improved method and apparatus for repetitively calculating the square root of distance for the purpose of controlling the velocity of a vehicle as it approaches a station at which a stop is required. This system uses a repeating calculating sequence to process the target distance. At the beginning of a calculating sequence, during a first step or step No. 1, the target distance is loaded into a register. At each succeeding step of the calculation, a specific amount is subtracted from the register so that the amount in the register decreases. The speed pattern is made proportional to the number of steps required to bring the contents of the register down to zero. The calculation is repeated many times per second.

If the specific amount which is subtracted each time is a constant, the relationship between the speed pattern and the target distance is linear. This occurs for a small portion of the calculating sequence, starting at step No. 2 and continuing to step x-1, where "x" is predetermined integer. This is to allow for the final rounding-off of deceleration where the deceleration is reduced to zero.

If the specific amount which is subtracted each time is increased by a constant amount at each step of the calculation, the speed pattern is proportional to the square root of the target distance. This procedure is carried out beginning with step x, during which an amount q is subtracted from the register. At step x+1 the amount q+d is subtracted, and at step x+2 the amount q+2d is subtracted. This continues, in a similar manner, for the remainder of the calculation.

If suitable values of q and d are chosen, the number of steps of the calculation which are required to reduce the contents of the register to zero can be used to determine how many speed relays should be energized, to obtain relay operation similar to that obtained from a mechanical selector. For example, 10 speed relays may be used, with all ten energized for maximum speed. When the target distance has initially decreased below the slowdown distance, only nine steps of calculation are required to bring the contents of the register to zero, and one of the speed relays is thereby de-energized. Further reduction in target distance results in only eight steps of calculation being required, and this causes a second speed relay to be de-energized so that only eight remain energized. This process continues in a similar manner until all of the relays are de-energized when the car reaches floor level where the target distance is zero.

This system automatically causes the speed relays to be de-energized at equally spaced intervals of time provided that the velocity is reduced by the same amount at each step. This corresponds with what has been considered the best practice on mechanical selectors. An important advantage of the solid state system according to the present invention, as compared to mechanical selectors, is the ability to increase or decrease the slowdown distance by changing the values of q and d. These values can be programmed by small toggle switches, for example. Corresponding adjustments on mechanical selectors are considerably more difficult.

Generally, while both q and d may be made adjustable, it is actually the ratio of these two values which is important. Therefore, a fixed value of d may be chosen which results in a reasonable number of steps for the entire calculation. Once the value of d is chosen, q can be adjusted to vary the ratio of q to d.

Basically, the correct value of q is determined by the amount of error (between desired speed and actual speed) which is required to produce the constant deceleration which exists for most of the slowdown. In my U.S. Pat. No. 3,706,017 entitled "Motor Speed Control", the slider 194 on resistor 190 in FIG. 9 can be adjusted to vary the amount of error required to produce the required amount of deceleration. Also, slider 524 on resistor 520 in FIG. 11 accomplishes the same result in a different manner. This adjustment is made to obtain a suitable smoothness for the speed control.

Changes in this adjustment (the sliders 194 and 524) require corresponding changes in the value of q if the constant deceleration is to be achieved. The adjustment is generally not critical, and has negligible effect at higher speeds. However, if q is set too low, the deceleration rate will increase toward the end of slowdown, just before the taper-off begins.

Similarly, if q is set too high, the deceleration rate will decrease toward the end of deceleration, before the taper-off begins. This may be an advantage, in some cases. The effect of armature reaction in the hoist motor usually shows during a down slowdown with a heavily loaded car, just about where the taper-off begins, and if there is a problem, it may be solved by using a higher setting of the quantity q.

In a preferred embodiment of this invention, very small values of q and d are chosen, so that the number of steps of calculation is high. A maximum of 256 steps, for example, is quite suitable. Then, the speed pattern (which is proportional to the number of steps required to reduce the contents of the register to zero) has so many possible values that it is almost equivalent to an analog signal. It is, in fact, expressed in the form of a repeating pulse whose length is proportional to the velocity pattern. This pulse goes high near the beginning of a calculating sequence, and goes low when the contents of the register have been reduced to zero. It is convenient to refer to this pulse as signal SR, for "Square Root".

In accordance with the present invention there is also provided a novel and improved apparatus for converting the pulse width-modulated signal SR, representing the square root of distance, into an analog signal for use as a speed pattern for a vehicle. More particularly, this analog computing system converts the width of each pulse on signal SR into a steady voltage which is proportional to this width. The steady analog voltage becomes the input to a speed regulating system, to dictate the desired speed of the vehicle.

The principal advantage of the present system of digital-to-analog conversion is to cause a single adjusting device, such as a potentiometer, to simultaneously adjust the deceleration rate of a vehicle and its slowdown distance so that whatever deceleration rate is chosen, deceleration automatically commences at the correct instant to assure that the selected deceleration rate will prevail during most of the stopping sequence, with a suitable rounding-off at the end of the stopping sequence which is also adjustable. The versatility of this system of digital-to-analog conversion will be illustrated by the disclosure of a method for automatically reducing the deceleration rate of an elevator and simultaneously increasing the slowdown distance, when it is travelling down with a heavy load. A similar reduction in acceleration rate is also described for a heavily loaded car travelling up.

An operational amplifier is used in the analog computing system as an integrator and it is convenient to refer to its output as the "working signal". At step 1 of each calculating sequence, the working signal is caused to assume an adjustable voltage proportional to the landing speed of the vehicle. Then, for steps 2 through x-1, an adjustable current is applied to the integrator to cause the working signal to increase at an adjustable rate. For step x and all succeeding steps, a second adjustable current causes the working signal to increase at a different rate.

When the contents of the calculating register have been reduced to zero, and the pulse on signal SR goes low, the value of the working signal is held in a sample-hold circuit until the similar sampling point is reached in the next calculation. Thus the voltage on the sample-hold circuit becomes the final output of the calculating system, and is used as an input to a speed regulating system. The calculation is repeated at a sufficiently high frequency that the sample-hold circuit changes its voltage by only a small amount at each sampling point.

The deceleration rate is adjusted by the second of the two adjustable currents mentioned previously. If this current is adjusted to a low value, a longer time is required for the working signal to reach a value corresponding to full speed, and this corresponds to a greater target distance. If this current is adjusted to a high value, a short time is required for the working signal to reach a value corresponding to full speed, and this corresponds to a short target distance. Thus a single adjustment controls the deceleration rate and also adjusts the slowdown distance to suit this deceleration rate.

Adjustment of the first of the two previously mentioned currents controls the constant of proportionality between the velocity pattern and target distance which exists during the final rounding-off at the end of a stopping sequence.

The system according to the present invention is particularly suitable for use with a speed control system such as disclosed in my U.S. Pat. No. 3,706,017, the subject matter of which is incorporated herein by reference. In this system the actual velocity of the vehicle lags behind the velocity pattern by an amount proportional to the acceleration of the vehicle. This eliminates the need for rounding-off at the commencment of a stopping sequence.

If a stopping sequence commences after the vehicle has reached top speed, the relationship between the velocity pattern and target distance can immediately assume the square root pattern which is required for the later part of the slowdown sequence. Although the velocity pattern will then start to decrease abruptly at the commencement of slowdown, the actual velocity cannot decrease abruptly, and a smooth transition from constant speed to constant deceleration is inherently achieved.

Similarly, if a stopping sequence commences while the vehicle is still accelerating towards top speed, a velocity pattern which is proportional to the square root of distance is precisely what is required for the speed regulating system of my U.S. Pat. No. 3,706,017 to smoothly control the transition from acceleration to deceleration.

For a more complete understanding of the present invention, reference may be had to the following detailed description taken in conjunction with the accompanying figures of the drawings in which.

Figure 4:
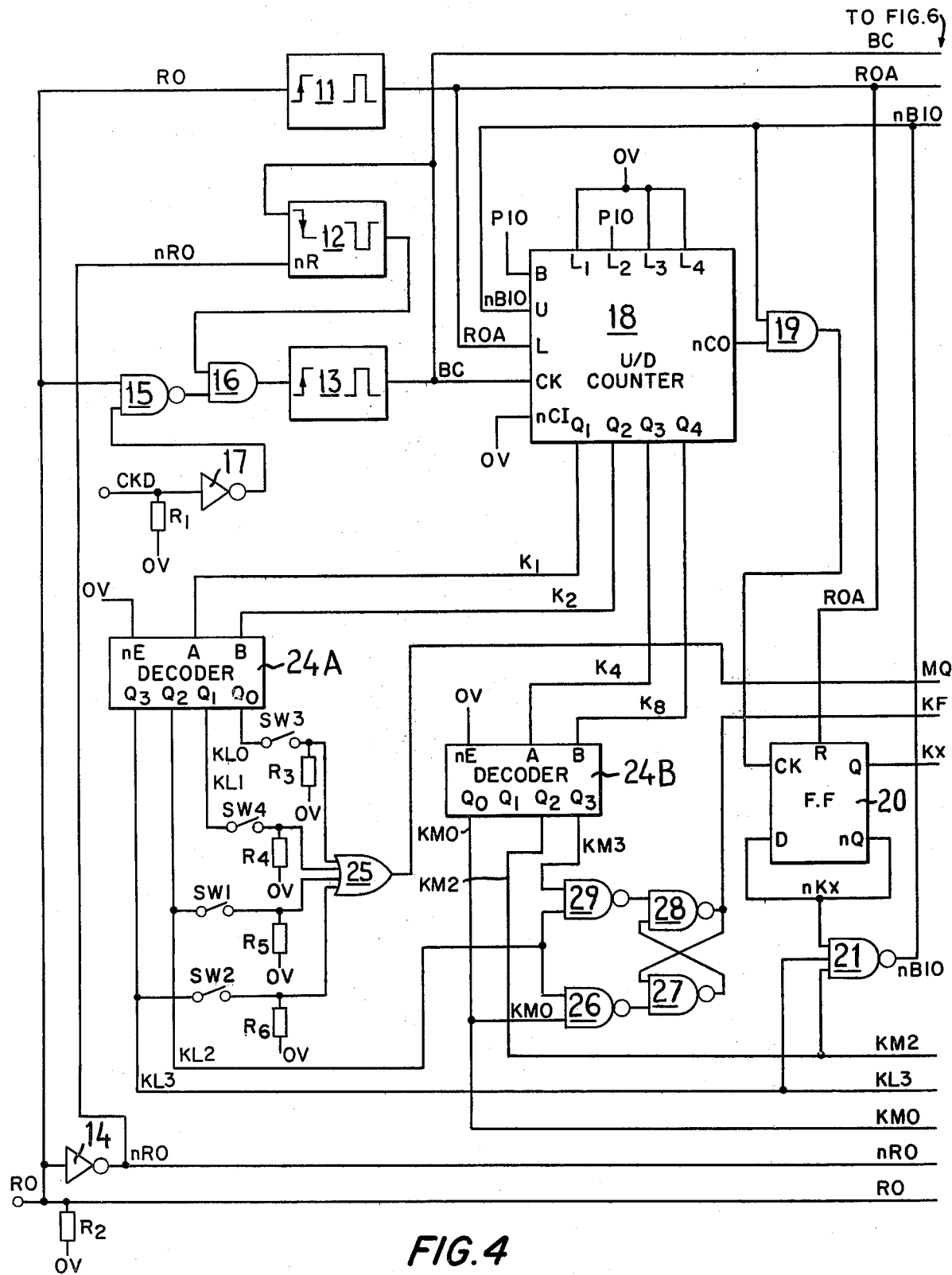
Figure 5:
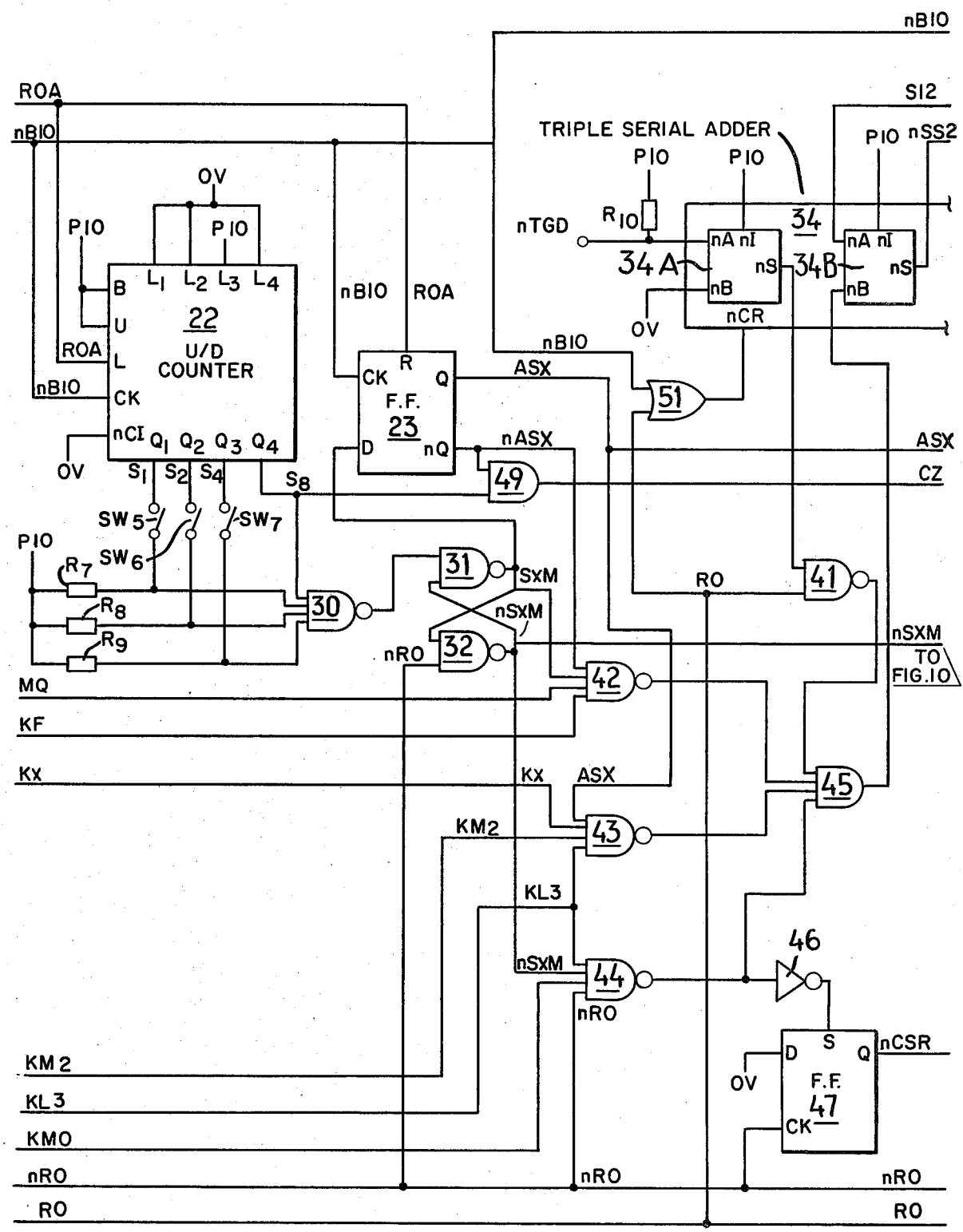
Figure 6:
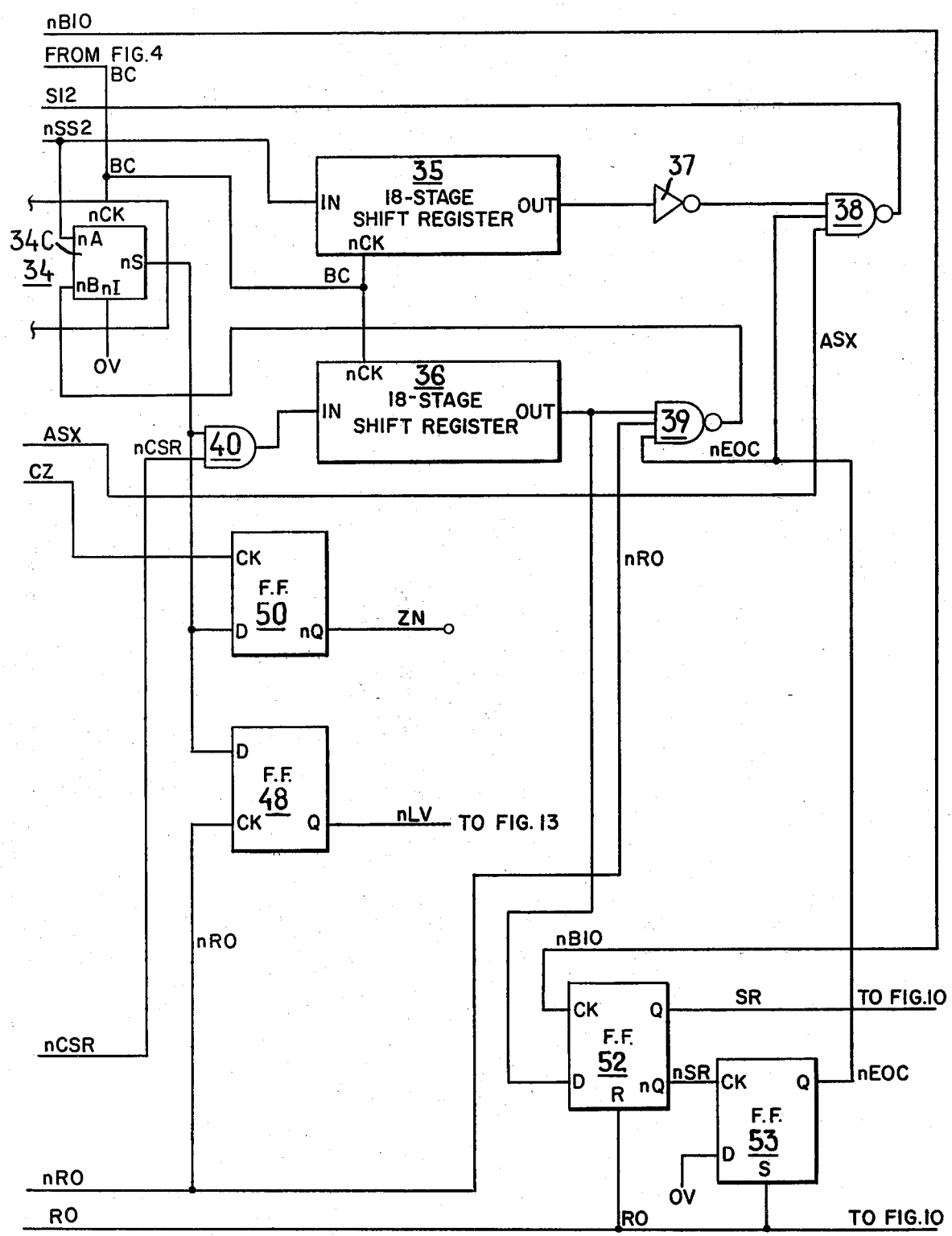
Figure 7A:
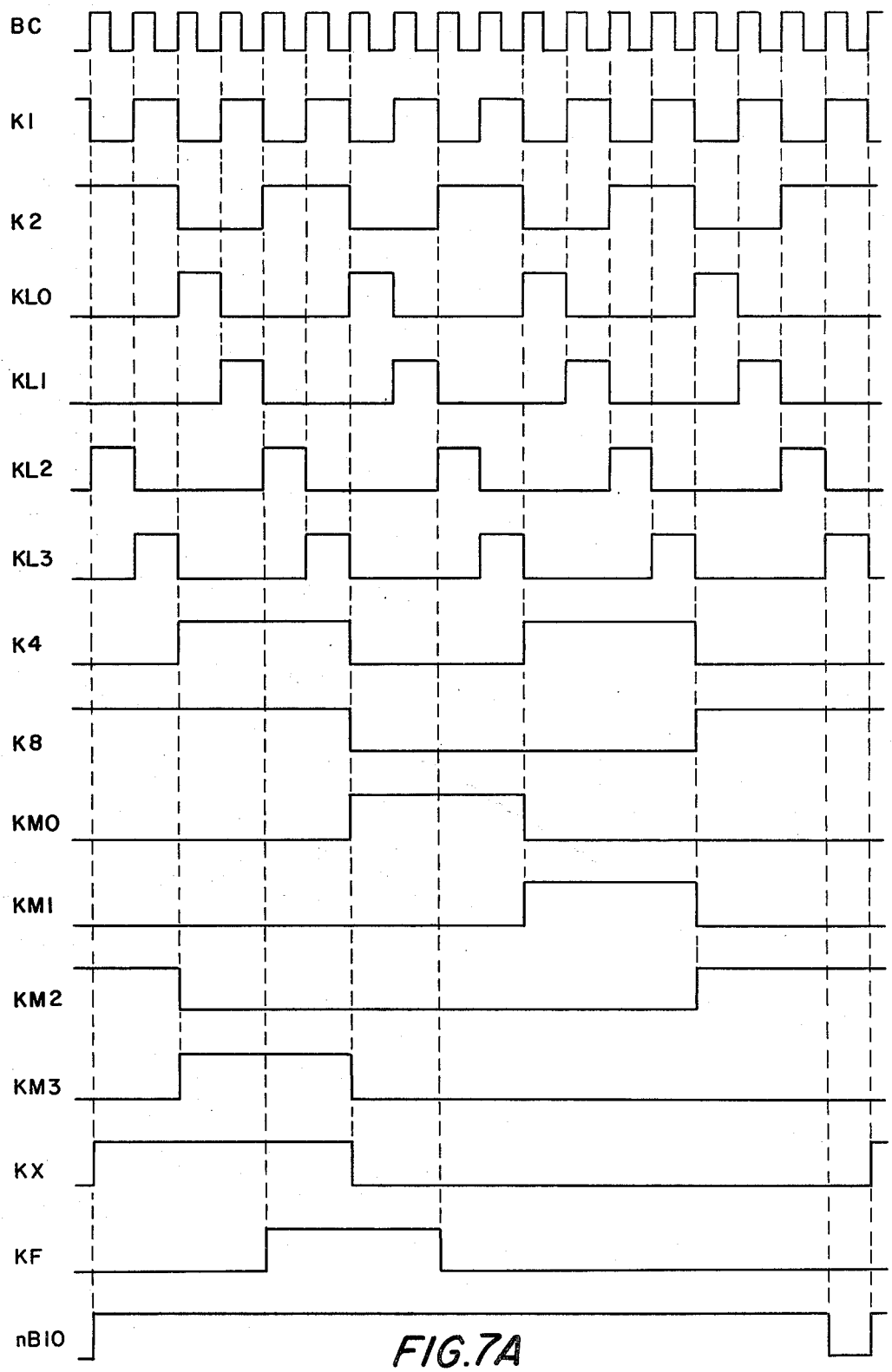
Figure 7B:
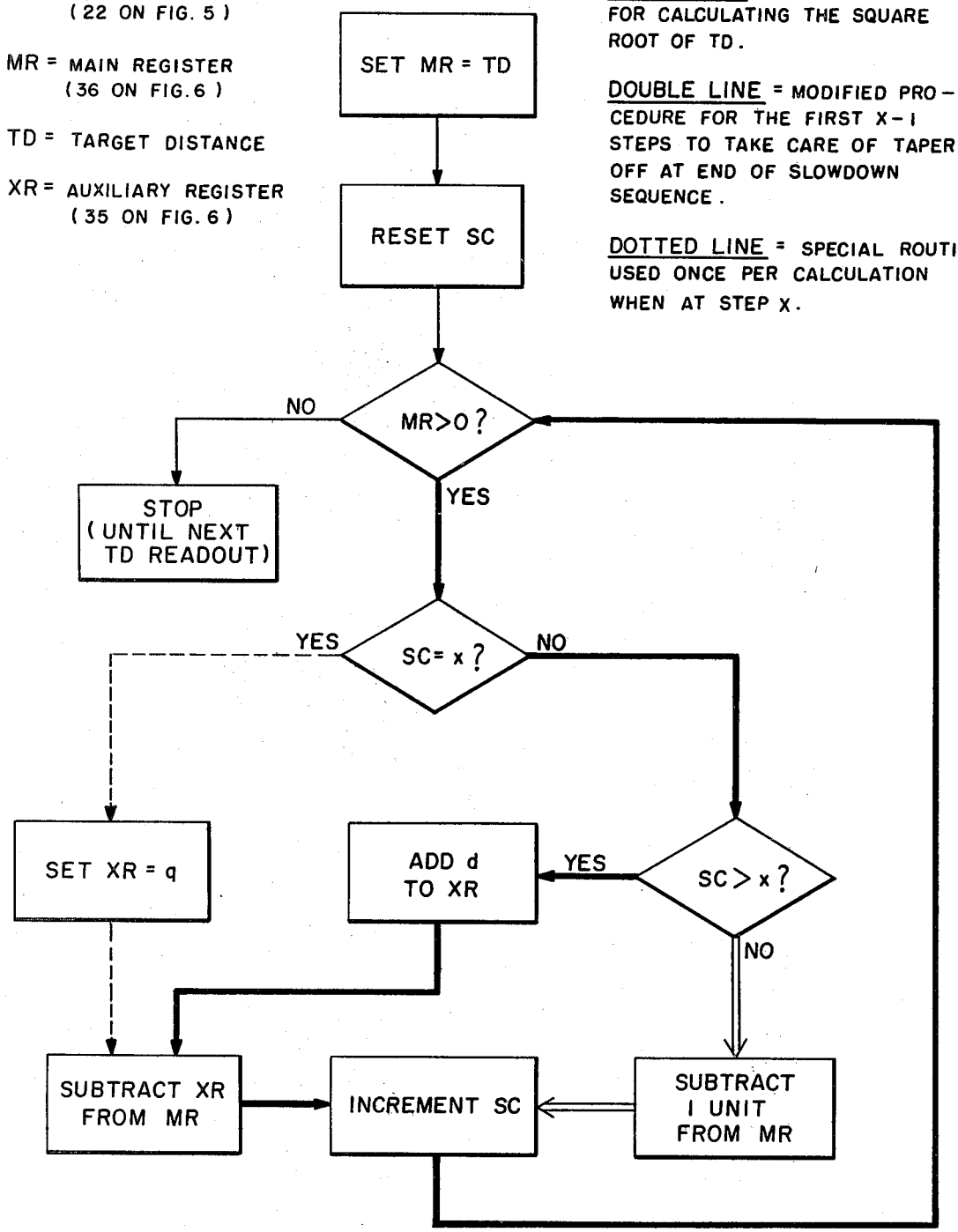

FIGS. 4, 5, and 6, taken together, show a circuit for calculating the square root of the target distance, or a portion thereof;

FIG. 7A shows some of the voltage waveforms associated with the circuit of FIG. 4;

FIG. 7B shows a program chart containing the calculation algorithm carried out by the circuit of FIGS. 4, 5 and 6.

Figure 8:
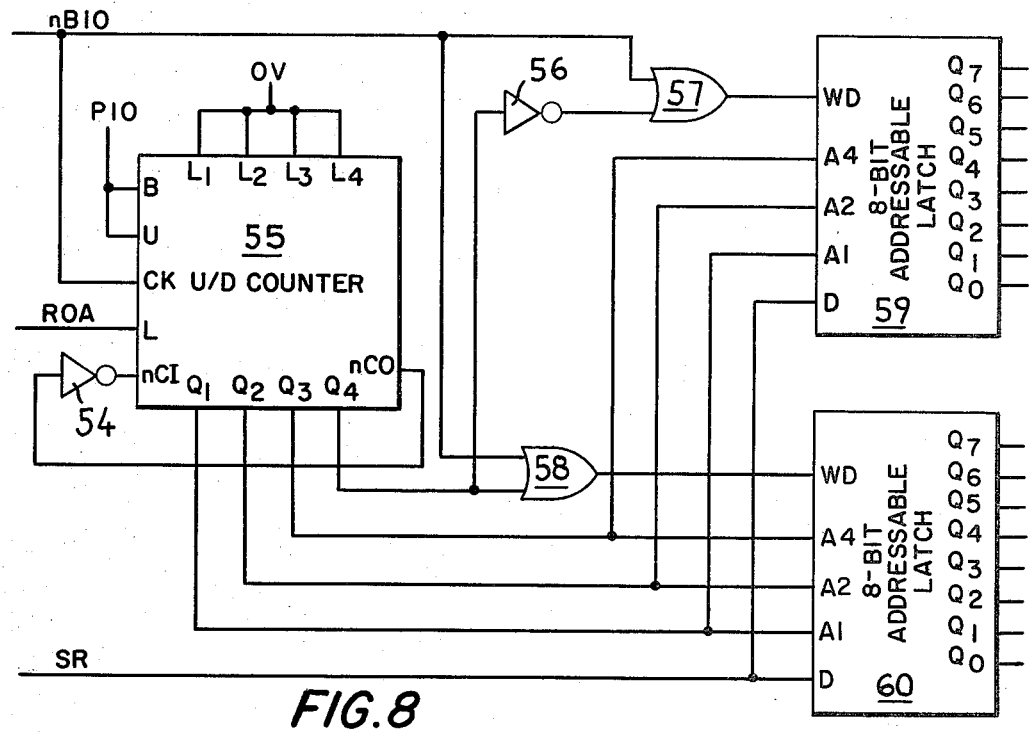
Figure 9A:
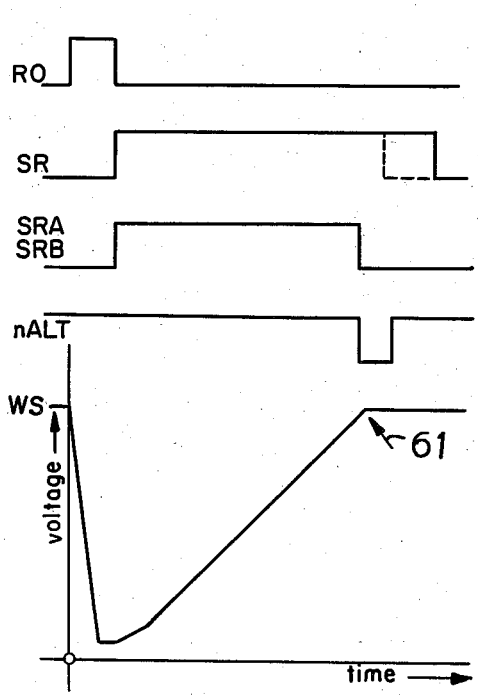
Figure 9B:
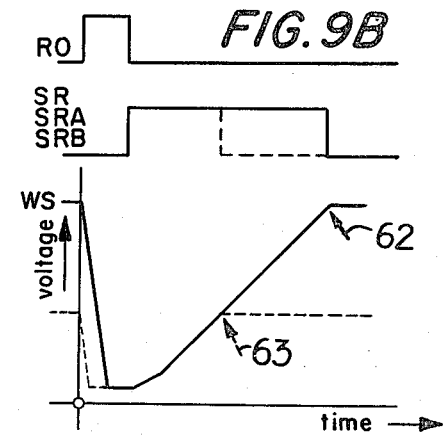
Figure 9C:
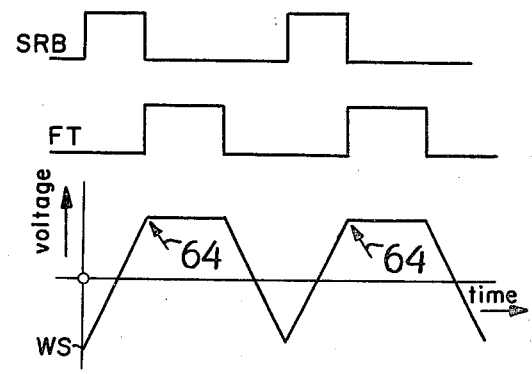
Figure 10:
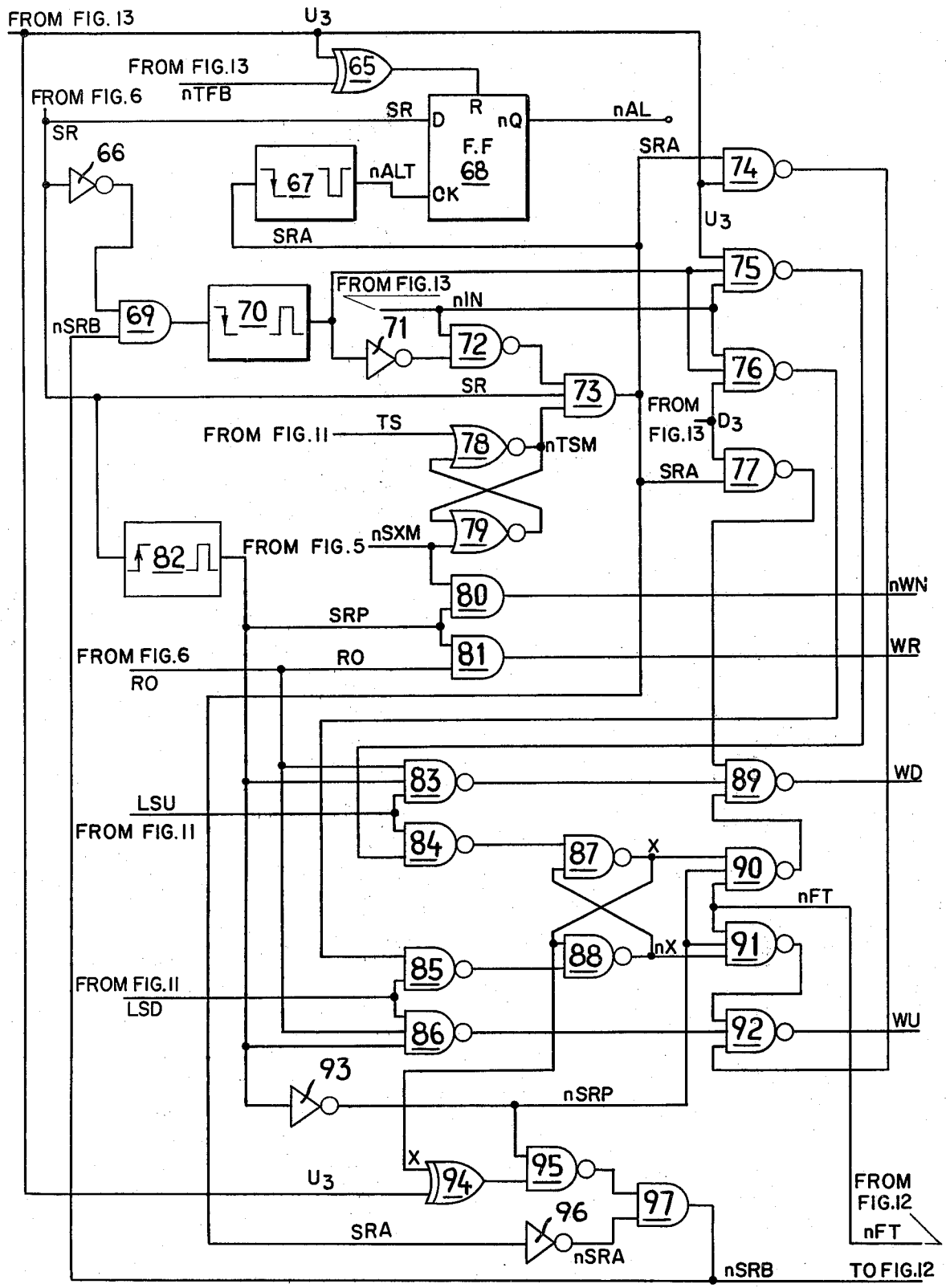
Figure 11:
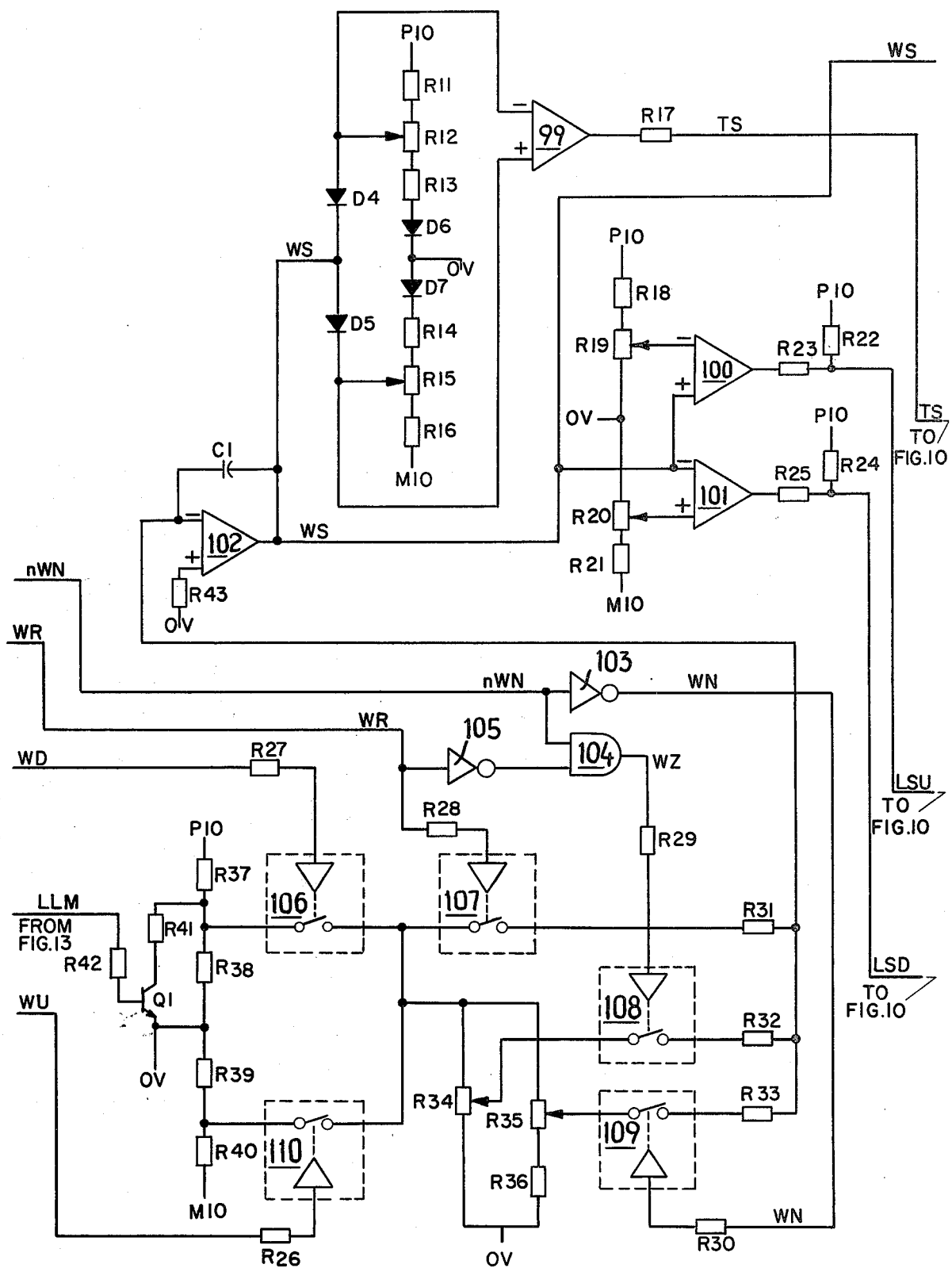
Figure 12:
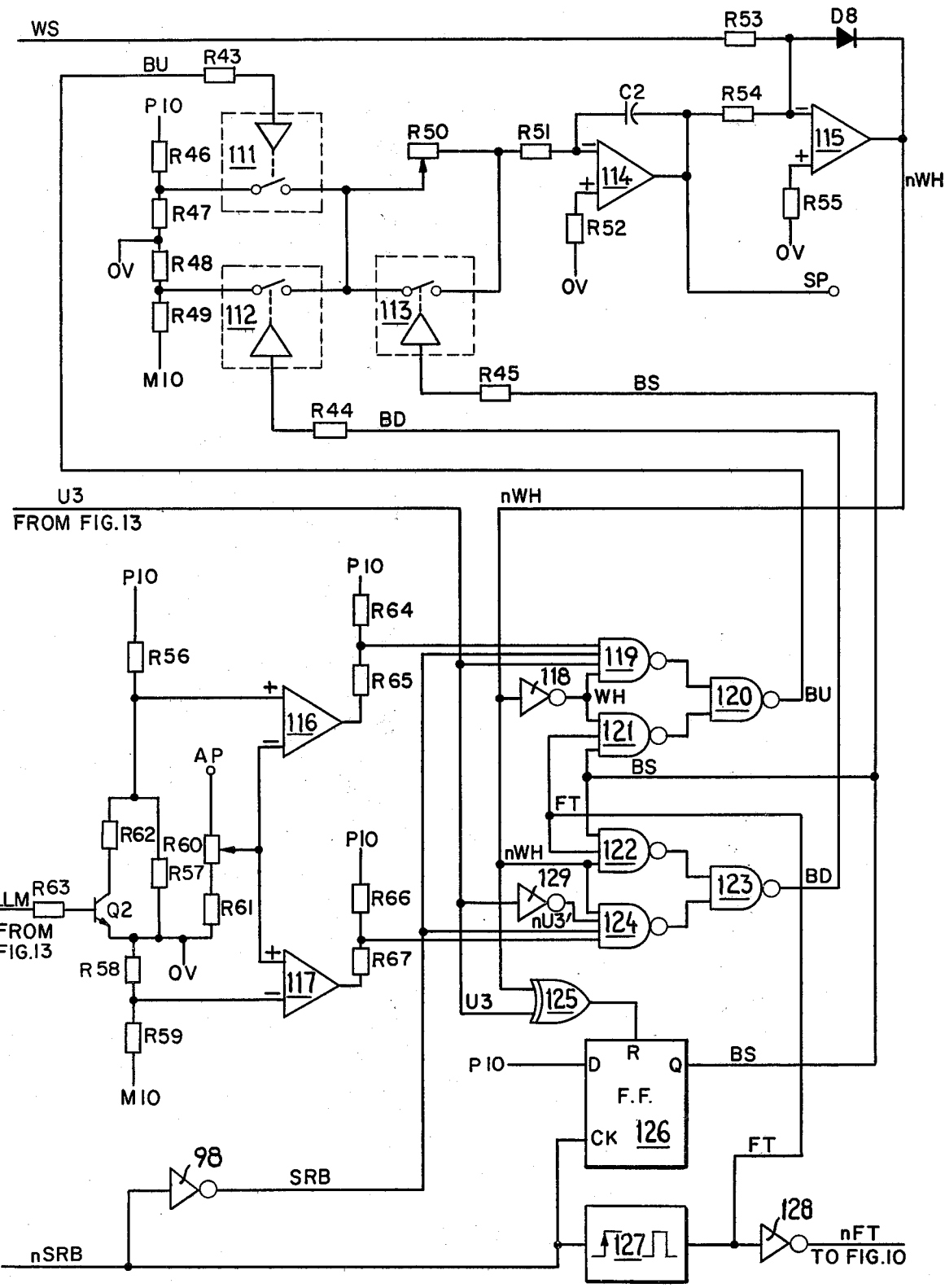
Figure 13:
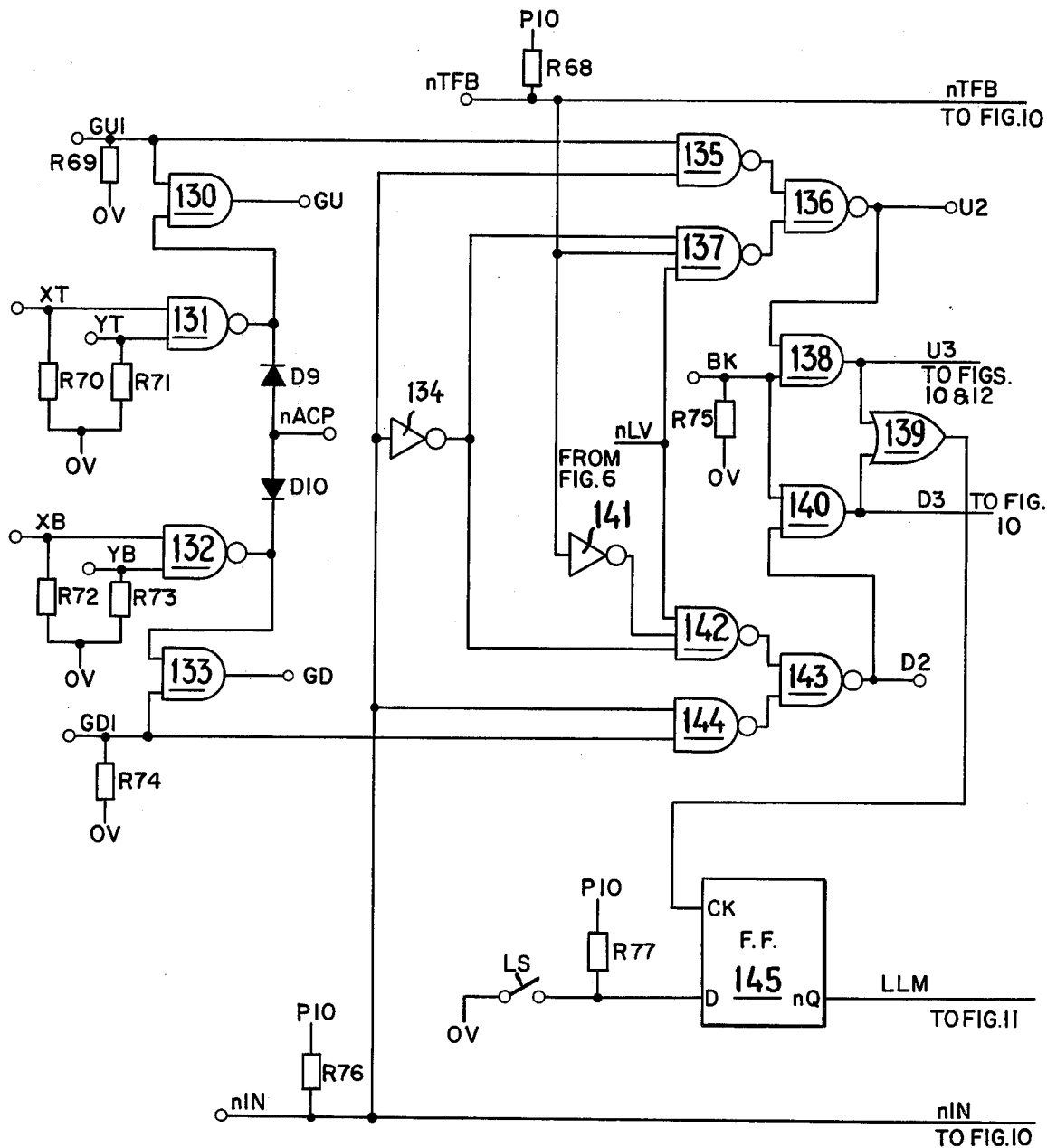

FIG. 8 shows a circuit for energizing speed relays in accordance with one preferred embodiment of this invention;

FIGS. 9A, 9B, and 9C illustrate graphically a method for producing an analog speed pattern in accordance with another preferred embodiment of this invention;

FIGS. 10, 11, and 12, taken together, show a circuit for producing an analog speed pattern in accordance with the method of FIGS. 9A, 9B and 9C; and FIG. 13 shows miscellaneous circuits to fit in with a typical elevator system.

Figure 1:
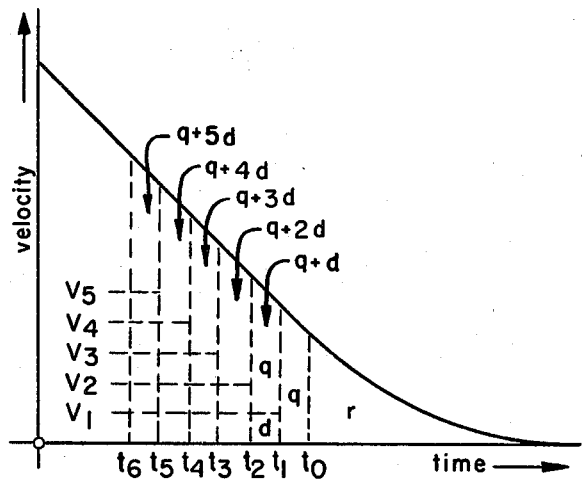
FIG. 1 illustrates graphically the computing procedure used in the present invention.

The basic computing procedure for producing a velocity pattern is illustrated by a graph in FIG. 1 where a solid line shows the relationship between velocity and time for a major portion of a stopping sequence for a vehicle. In this figure it is the straight line portion of the graph which is of particular interest, but a typical rounding-off to zero acceleration is also illustrated. The initial part of the stopping sequence is not shown.

A vertical dotted line is drawn at time $t_0$ which corresponds with the end of the straight line portion. Further vertical dotted lines are drawn at time $t_1$, $t_2$, $t_3$ etc. such that they represent events which are equally spaced apart in time.

The area under the solid line is proportional to the distance travelled, and thus the area below the solid line between the vertical dotted lines at $t_1$ and $t_0$ is proportional to the distance travelled between these two times. This distance will be given the value q. The distance travelled after $t_0$ will be given the value r.

The next area, between $t_2$ and $t_1$ is greater than the preceeding area by an amount which will be given the value d. A horizontal dotted line $v_1$ is drawn to separate this area into an upper portion with area q and a lower portion with area d. Similar lines $v_2$, $v_3$, $v_4$, etc. can be drawn as shown in FIG. 1.

Because of the constant deceleration, as a result of the straight line relating velocity to time, each succeeding area, progressing from right to left, is greater than the preceeding area by the amount d. The successive areas are q, q+d, q+2d, q+3d, q+4d etc. as shown in FIG. 1.

In FIG. 1, the flow of real time is directed from left to right. The flow of time during the computing sequence is from right to left on the graph, and is at a much higher speed so that during any one computing sequence, the flow of real time is very small and real time can be considered to have stopped at a specific value during said computing sequence.

Basically, the computing sequence involves the successive subtraction of quantities r(preferably in several equal steps), q, q+d, q+2d, q+3d etc. from an initial quantity equal to the target distance. Each subtraction is considered to be one step of the computing sequence, and the number of steps required to completely deplete this initial quantity can, in one embodiment of this invention, be used to determine the number of generator field controlling relays which should be energized.

If, for example, real time has progressed to somewhere between $t_5$ and $t_4$, and if it is assumed that the quantity r is subtracted in three equal steps, seven steps of the computing sequence will not quite deplete the initial quantity, but eight steps will more than deplete the initial quantity. Thus the actual switch points, where the number of steps required to deplete the initial quantity changes, occur at times $t_6$, $t_5$, $t_4$, $t_3$, etc. which are equally spaced in real time. The speed control system must cause equal reductions in speed at each such step to achieve the constant deceleration.

Figure 2A:
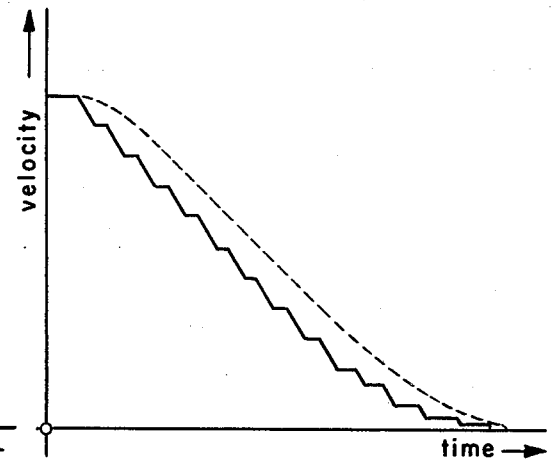
FIGS. 2A and 2B illustrate graphically a velocity pattern, on a time base, which can be obtained with this computing procedure, and the corresponding vehicle velocity.

FIG. 2A shows, by a solid line, a speed pattern which might be produced in this way by a series of steps produced by relays and smoothed by ramp smoothing as disclosed in my U.S. Pat. No. 3,706,017. The actual velocity is shown by a dotted line in FIG. 2A for a stopping sequence which commences while the velocity is steady at full speed.

Figure 2B:
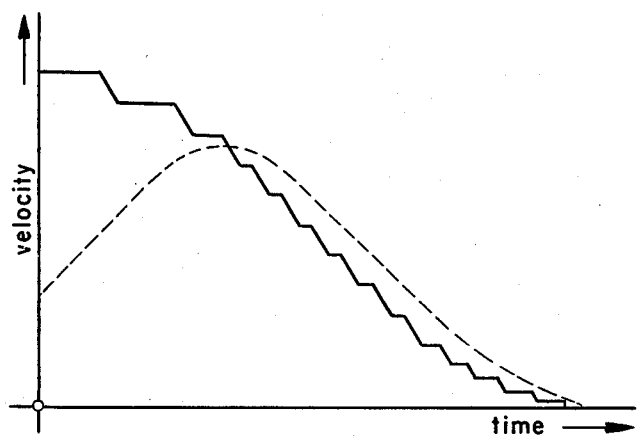

FIG. 2B shows, in a similar manner, a stopping sequence which commences while the vehicle is still accelerating toward top speed. The speed pattern is still computed in the same way, but initially the velocity is low, and thus the time required for the pattern to decrease by one step is much greater than it would be if the vehicle were decelerating from top speed as in FIG. 2A. As the vehicle accelerates, the increasing velocity causes the steps in the speed pattern to occur at more frequent intervals. The dotted line shows the actual velocity.

When, in FIG. 2B, the decreasing speed pattern approaches the rising vehicle velocity, the full acceleration is succeeded by a gradual reduction in acceleration as the error between actual speed and pattern speed decreases. At the instant the two curves cross, zero acceleration is called for. Then, the decreasing pattern velocity becomes lower than the actual velocity, and the acceleration becomes gradually more negative until constant deceleration is achieved. The smoothness with which this transition takes place is adjustable by means described in my U.S. Pat. No. 3,706,017.

Figure 3:
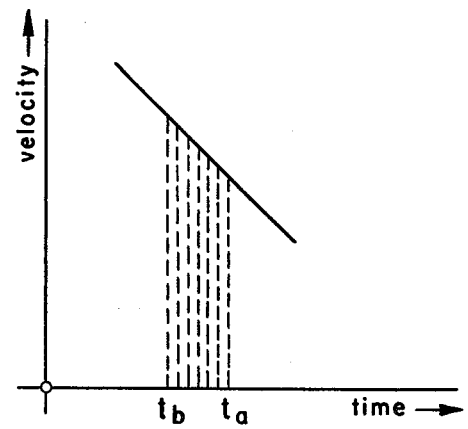
FIG. 3 illustrates graphically a further extension of this computing procedure used in the present invention.

In FIG. 3 a small portion of the straight line portion of the graph of velocity versus time is expanded on the time axis to show, in a manner similar to FIG. 1, the result of making q and d have much smaller values. The area between time $t_a$ and $t_b$ in FIG. 3 is assumed to be equal to the height of one cell on a loop stick as described in my co-pending patent application Ser. No. 728,006, filed Sept. 29, 1976. This height is typically 2½ inches.

From FIG. 3 it can be seen that although the computing procedure has a number of steps between $t_b$ and $t_a$, with corresponding tiny steps in speed pattern, only the speed patterns corresponding to $t_b$ and $t_a$ are actually used since the target distance which is loaded initially into the calculation can only assume values which are multiples of 2½ inches or whatever height is used for the cells in the loop stick. The quantities q and d, however can have fractional values.

Generally, the total number of steps of calculations which are allowed should be as high as possible to approach equivalence with an analog signal. However, if there are too many steps, the calculation will require too much time to complete, and it will not be possible to repeat the calculation at a high enough frequency to keep it up to date with the decreasing target distance. A suitable value to avoid these two extremes is 256 steps, but fewer or more could be used successfully.

With a maximum of 256 steps, and with cells of approximately 2½ inches, a reasonable portion of the stopping sequence has a step of speed pattern occurring every 2½ inches. However, when the target distance is large, the reduction in speed pattern required for each 2½ inches of travel is quite small, and because there are only 256 discrete values of velocity pattern, frequently no reduction in speed pattern will occur after 2½ inches of travel, and several cells of 2½ inches will have to be passed before the speed pattern can change from one of its 256 discrete values to the next.

This lack of a step in the speed pattern for each 2½ inches of travel does not degrade the accuracy of the resulting performance of the vehicle, for the steps are still very much more closely spaced in time than with conventional systems. The important part of the stopping sequence is closer to the end where each succeeding reduction of 2½ inches in target distance results in larger and larger reductions in speed pattern. Here, a reduction every 2½ inches is closer to current practice, but is still generally superior to the best of current mechanical selector systems. With ramp smoothing of the speed pattern, there is no need to seek finer steps, although the basic principle of this invention places no restriction on the use of finer steps of measurement of target distance.

FIGS. 4, 5 and 6 show a circuit for creating a signal SR which is generally proportional to the square root of distance (except for the rounding-off at the end of a stopping sequence). This circuit operates in accordance with the algorithm illustrated in FIG. 7B. In FIG. 4 a basic clock consists of a monostable multivibrator (MM) 12, MM 13 and AND gate 16. The output BC of this basic clock is a square wave which is high for a period of time determined by MM 13 and which is low for a period of time determined by MM 12; these times could be equal. A frequency of about 250 KHz would be appropriate for this clock.

During the entry of data, when the target distance is sequentially loaded into the system, the basic clock is caused to assume a different frequency, generally slower, to match the frequency of the read-out sequence of the calculator which repetitively calculates the target distance. Such a calculator is disclosed in my co-pending patent application Ser. No. 728,006 filed Sept. 29, 1976. Output RO, in this co-pending patent application, is high during the read-out period, and output CKD happens to be suitable for driving the basic clock during this period. Similar signals would be required from any other system for determining target distance.

While input RO is high, the output nRO of inverter 14 is low and this holds the reset input nR of MM 12 low so that its output is high. This enables the pulses on input CKD to be gated through INVERTER 17, NAND gate 15 and AND gate 16 into the input of MM 13. The resulting output pulses of MM 13 remain high for the same length of time as during normal clocking, but the pulses are spaced further apart in time, if necessary, to follow the slower clocking of input CKD.

The basic clock signal BC is applied to an 18-step counter consisting of U/D binary counter 18, gate 19 and clocked flip-flop (FF) 20. If counter 18 is CMOS type 4029, input B must be connected to the positive supply line P10 to produce binary counting rather than binary-coded decimal counting. Also, "carry-in" input nCI must be connected to the negative supply line OV.

A four-digit binary counter such as counter 18 in FIG. 4 is itself capable of only 16 steps, but 18 are steps obtained by stepping it backward one step at a particular count, so as to repeat two of the 16 steps. The output KX of FF 20 distinguishes between the two original and the two repeat steps so that 18 identifiable steps are obtained.

The input U of counter 18 is connected to signal nB10 which is high for 17 of the 18 steps, to cause up counting; for one of the 18 steps it is low to cause down counting.

The two least significant outputs of counter 18 are decoded by decoder 24A which could be one half of a dual decoder such as the CMOS type 4555. The two most significant outputs of counter 18 are decoded by decoder 24B which could be the other half of the dual decoder. If type 4555 is used, the enable input nE must be held low in each half by connection to the negative supply line 0V, as shown on FIG. 4.

The time relationship of the eight decoded signals KL0, KL1, KL2, KL3, KM0, KM1, KM2, and KM3 are shown in FIG. 7A along with other signals produced by the circuits of FIG. 4. A flip-flop consisting of NAND gates 26, 27, 28 and 29 is used to create signal KF which is used to identify a portion of the 18 steps for a purpose to be described later.

The 18 repeating steps obtained from the circuits of FIG. 4 are used to control the sequential processing of 18-bit binary numbers. Ten of these 18 steps are used to directly represent distances expressed in units of about $2\frac{1}{2}$ inches; one of these ten digits is a polarity bit and this leaves 9 bits which can represent up to 511 units, or about 106 feet. The remaining 8 digits are used to express fractions of the basic unit of $2\frac{1}{2}$ inches. The least significant digit represents 1/256th of a unit.

Slowdown distances of more than 106 feet are required only for speeds over 1800 feet per minute, and thus nine bits are sufficient for most elevator applications. For other applications, the basic unit of $2\frac{1}{2}$ inches could be increased, or additional binary bits could be added to the calculation without altering the basic idea.

At the instant when signal RO goes high, MM 11 is triggered and its resulting output pulse ROA is used to set the counter 18 and the flip-flop 20 to the appropriate state to identify the least significant digit of the target distance, ignoring the eight fractional digits. The load inputs L1, L3, and L4 of counter 18 are connected to 0V and load input L2 is connected to P10 to achieve the desired loading of the counter when ROA is high.

After the initial read-out period, the 18 bits are sequentially processed starting with the least significant bit and proceeding through to the most significant bit b10; when bit b10 is being processed, NAND gate 21 makes signal nB10 low.

Signal nB10 is applied to the clock input CK of binary counter 22 in FIG. 5, to cause it to advance one step when signal nB10 goes high after the most significant bit has been processed. Thus counter 22 counts the steps of the calculation, where each step has 18 parts, one part for each bit. The purpose of counter 22 is to identify step x which is adjustable by switches SW5, SW6, and SW7. During step x, all inputs to NAND gate 30 are high, and its output is low.

Counter 22 is loaded to a specific count when signal ROA goes high at the beginning of a data entry sequence when RO is high. Load inputs L1, L2 and L4 of counter 22 are connected to 0V, and load input L3 is connected to P10. Thus, counter 22 is initially loaded to a count of four.

If switches SW5, SW6 and SW7 are all open, three of the inputs to gate 30 are held high by resistors R7, R8 and R9, and four steps are required before counter 22 has advanced to a count of eight to make signal S8 high.

This corresponds to x=5 and is the minimum setting. With signal S8 high, all inputs to gate 30 are high to make its output low.

If switch SW5 is closed, and switches SW6 and SW7 are open, signal S1 will hold one of the inputs of gate 30 low at a count of eight on counter 22 and it is not until the count of nine that all inputs to gate 30 are high. Thus with switch SW5 only closed, x=6. By similar reasoning, x=7 when switch SW6 only is closed.

By closing appropriate combinations of switches SW5, SW6 and SW7, x can have any value between 5 and 12 inclusive. This corresponds to distances of 10 inches through 27.5 inches in 2.5 inches steps, assuming 2.5 inches for each unit of distance. This adjustment determines the distance over which the final rounding-off will occur.

At step x, the output of gate 30 is low, and this sets a flip-flop consisting of gates 31 and 32 which was previously reset during the RO period when nRO was low. When this flip-flop is set, signal SXM goes high and signal nSXM goes low. These signals serve to distinguish between steps 1 through x−1, when SXM is low, and step x and all succeeding steps when SXM is high.

A clocked flip-flop 23 is clocked by signal nB10 and uses signal SXM for its data input. This causes signal ASX to go high for step x+1 and all succeeding steps. Flip-flop 23 is reset by signal ROA. Signal nASX is an inverted form of signal ASX.

Thus, signals SXM and ASX divide the steps into three parts:
(1) steps 1 to x−1 when both signals are low;
(2) step x when SXM is high but ASX is still low;
(3) step x+1 and up, when both signals are high.

After step 12, counter 22 steps to a count of zero and repeats its counting but has no further effect on signals SXM and ASX until after the next data entry sequence when signal RO is high.

A further group of switches SW1, SW2, SW3 and SW4 is provided as shown on FIG. 4, to create a 4-bit binary number expressed in serial form on signal MQ. The signal MQ is only used during the period when KF is high, and during this period the outputs of decoder 24A go high, one at a time, in the order KL2, KL3, KL0 and KL1.

At each of these four steps, signal MQ will be high only if the corresponding switch is closed, via OR gate 25. The 4-bit number thereby created on signal MQ is equivalent to the amount q which is adjustable and can assume any one of 15 different values. The 16th condition with all four switches open, must not be used.

In the above summary of this invention, the calculating procedure is described as the subtraction of increasing amounts q+d, q+2d, q+3d etc. at steps x+1, x+2, x+3, etc. In FIGS. 5 and 6, the opposite procedure is used to facilitate the use of serial adders. The target distance is loaded into a shift register 36 as a negative number and the increasing numbers q, q+d, q+2d etc. are created in shift register 35 and are added to the contents of shift register 36 at each step at the calculation. When the contents of shift register 36 change from negative to positive, the output signal SR goes low. This procedure has the same final result as the procedure described in the summary.

The circuit of FIG. 5 uses a CMOS triple serial adder 34 of types 4038; this device has internal carry and thereby avoids the need for further external circuits. Other devices could, of course be used with suitable modifications to FIGS. 5 and 6. Similarly, the two 18- stage shift registers 35 and 36 can be CMOS type 4006 or any other suitable type. If type 4006 is used, the four internal sections must be externally connected together to get 18 stages; this is not shown on FIG. 6 but would be apparent to anyone skilled in the art.

During step 1, RO is high and the target distance enters as a sequential 10-bit binary number on input nTGD. One section 34A of triple serial adder 34 is connected to convert the target distance into a negative number. The connection of input nB of adder 34A to the negative supply line OV is equivalent to adding binary number 1 111 111 111 which is interpreted as $-1$ by the adder. The output nS of adder 34A is already inverted by the characteristics of type 4038 and thus inverting input nI of adder 34A is connected to P10 to prevent further inversion. The combination of subtracting 1 and inverting causes the target distance to be converted from a positive number into a negative number in the familiar 2's complement form.

During step 1, the target distance, as a negative number, is entered into shift register 36 via NAND gate 41, AND gate 45, serial adders 34B and 34C and AND gate 40. During this step, all other inputs to gate 45 are kept high because inputs SXM, ASX and nRO, into NAND gates 42, 43 and 44 respectively, are all low.

Also during step 1, no data enters the other input nA of adder 34B since signal ASX is low to hold the output S12 of NAND gate 38 high. Similarly signal nRO is low to hold the output of NAND gate 39 high to prevent the entry of data into the other input nB of adder 34C.

During steps 2 through $x-1$, data on signal nSS2 enters input nA of adder 34C via gates 44 and 45 and adder 34B. This data consists of one positive pulse at each step, timed to occur when signals KM0 and KL3 are both high as controlled by gate 44. This timing agrees with the time during which a particular bit of the 18-bit sequence is processed: the bit whose weight is equivalent to one cell of 2.5 inches. This occurs, of course, after the eight fractional bits have been processed.

A circuit is provided in FIG. 5 to assure that any fractional bits left over in shift register 36 are cleared during the early part of step 2. This circuit consists of inverter 46 and clocked flip-flop 47. At the end of the RO period, when signal nRO goes high, the Q output of flip-flop 47 goes low because data input D is connected to OV. The first time the output of gate 44 goes low, the flip-flop is set via inverter 46 so that its output Q is high. This output (signal nCSR) is applied to AND gate 40 force the input of shift register 36 low during this period. This period is when fractional bits are processed.

During steps 2 through $x-1$, inputs RO, SXM and ASX to gates 41, 42 and 43 respectively, are low; this makes their outputs high so that data enters gate 45 only from gate 44. This data which enters input nA of adder 34C is added to the present contents of shift register 36 which is routed through gate 39 which has its other two inputs nRO and nEOC both high. The resulting sum is inverted by adder 34C (by input nI of adder 34C being connected to OV) so that it is now high to indicate 1 and low to indicate 0. This sum is entered back into shift register 36 via gate 40. Thus the contents of the register are changed, one bit at a time from the previous value to the new one.

Thus it can be seen that during each step between step 2 and step $x-1$ inclusive, the negative number in shift register 36 is reduced to a negative number of lesser magnitude by the amount of one cell of 2.5 inches.

If the target distance is less than the amount allotted to the rounding-off distance, the contents of shift register 36 will change from negative to positive sometime prior to step x, and obviously the number of steps required to do this is directly proportional to the target distance. The detection of which the contents of shift register 36 become positive is accomplished in clocked flip-flop 52 which is arranged to clock the output of shift register 36 at the end of each step when the most significant bit b10 is available on the output of the shift register.

During step x, data enters input nA of adder 34C via gates 42 and 45, and adder 34B. The data which enters is the amount q as adjusted by switches in FIG. 4 as previously described. The outputs of gates 41, 43, and 44 are held high during step x by inputs RO, ASX and nSXM being low. The only difference between step $x-1$ and step x is that the amount q is added, rather than one cell, into shift register 36. Although shift register 35 has not yet been used in the calculation, it is receiving at its input the same data which is presented to input nA of adder 34C. Thus, at the end of step x, the amount q has been entered into shift register 35.

During step $x+1$, signal ASX is newly high so that the contents of shift register 35 are applied to input nA of adder 34B via inverter 37 and NAND gate 38. Input nB of adder 34B receives one pulse at the beginning of step $x+1$ via gates 43 and 45. This one pulse is timed to represent the least significant fraction, and this is equivalent to giving the least possible value to the quantity d. The output nS of adder 34B is thus the sum $q+d$.

At each succeeding step, the contents of shift register 35 are increased by the amount d in a manner similar to the description in the preceeding paragraph. At the same time, this increasing number from shift register 35 is added to the contents of shift register 36; thus the amount added in steps $x+1$, $x+2$, $x+3$ etc. is $q+d$, $q+2d$, $q+3d$ etc.

At the end of each step, when nB10 goes high, clocked flip-flop 52 has its clock input CK made high by signal nB10 so that the most significant bit now available on the output of shift register 36, and applied to data input D of flip-flop 52, causes output SR of flip-flop 36 to assume a state corresponding to the polarity of the binary number in shift register 36. During step 1, when RO is high the flip-flop 52 is reset so that SR is low. At the end of step 2, SR becomes high unless the target distance is one unit or less. Signal SR remains high until the contents of shift register 36 have become positive. Thus the length of time during which signal SR is high is proportional to one less than the number of steps of calculation required to deplete the target distance by decreasing its negative value in a series of steps.

A further clocked flip-flop 53 uses the inverted output nSR of flip-flop 52 to create signal nEOC which goes low when nSR goes high to signify the end of the calculation. It remains in this state until step 1 when signal RO sets flip-flop 52.

Signal nEOC is applied to gates 38 and 39 to prevent any further increases in the contents of shift registers 35 and 36 while the circuit awaits the start of the next calculation, when RO goes high again as an up-dated target distance is entered into the system.

The data input for clocked flip-flop 52 is obtained from the output, rather than the input of shift register 36. This is done to make the pulses on signal SR disappear not only when the target distance is zero, but also when the target distance is only one unit. This is to assure that in circuits to be described later in connection with FIG. 10, the velocity pattern will assume an adjustable value equivalent to landing speed for the last 2 inches of travel.

A further clocked flip-flop 48 uses the output of adder 34C as its data input; the resulting output nLV is low when the target distance is zero, indicating that the car is level at the target floor. Here, level is taken to mean within ½ inch of exact alignment. If the target distance is not zero, indicating that the car is more than ½ inch from the target floor, signal nLV is high.

Another clocked flip-flop 50 can be provided to create signal ZN which may be useful. The zone loops described in my co-pending patent application Ser. No. 728,006 filed Sept. 29, 1976, can be used to create signals which indicate when the car is within a specified distance of any floor. Signal ZN, however, is high only when the car is close to the target floor. The use of signals S8 and nASX through gate 49, as the clock input CZ of flip-flop 50, makes the signal ZN high when the car is closer than 10 inches to the target floor. This signal can be used, for example, to limit the power opening of the elevator doors to a region extending 10 inches above and below the target floor.

The basic clock signal BC is applied to the nCK inputs of both shift registers and the triple serial adder. This is required on the shift registers to specify when the data should be shifted. This input is required on the adders to clock the internal carry latch. Also, input nCR (carry reset) of the adders is connected to the output of OR gate 51. This is to separate each step of the calculation so that there is no carry-over from the most significant bit into the least significant bit. This nCR input is low when nB10 is low except during the RO period.

FIG. 8 shows a circuit for using signal SR to control the deenergization of conventional speed relays during slowdown. Two 8-bit addressable latches 59 and 60 are used to control up to 16 speed relays. Any of the 16 outputs of these two 8-bit latches can be amplified, by circuits not shown here, to drive relays.

The circuit of FIG. 8 requires signals nB10, ROA and SR as inputs; these signals have already been described in connection with FIGS. 4, 5 and 6. A counter 55 is operated in a manner similar to counter 22 on FIG. 5 and thus it counts the steps of the calculation. Counter 55, however, is loaded to zero when ROA goes high, because its load inputs L1, L2, L3 and L4 are connected to the negative supply line 0V. Also, the carry-in input nCI of counter 55 is obtained by inverting the carry-out input nCO by inverter 54; this causes the counter to stop at the maximum count of 15 (last step of sixteen numbered from 0 to 15) and ignore further pulses on signal nB10 until counter 55 is reset when ROA goes briefly high at the start of the next calculation.

During the first eight steps of the calculation, output Q4 of counter 55 is low and thus the output of inverter 56 is high. This causes the WRITE DISABLE input WD of 8-bit latch 59 to be held continuously high via OR gate 57 while the similar input of 8-bit latch 60 follows the pulses on signal nB10 via OR gate 58.

During the second eight steps of the calculation, output Q4 of counter 55 is high and thus the output of inverter 56 is low. This causes the WRITE DISABLE input of 8-bit latch 60 to be held continuously high via OR gate 58 while the similar input of 8-bit latch 59 follows the pulses on signal nB10 via OR gate 57. At the last of these second eight steps, the counter 55 stops responding to the nB10 pulses, and holds this state until the next calculation starts.

During both of these eight steps, the Q1, Q2 and Q3 outputs of counter 55 are progressively addressing the eight latches in each of the two 8-bit latches 59 and 60. The information contained in signal SR is being written into these latches, and after the process is complete, each of the sixteen latches holds a condition representing the stage of signal Sr at the time of the writing. Depending on the length of the pulse on signal SR, more or fewer latches will be holding the high state. Each of the sixteen latches has its state applied to a corresponding output Q0, Q1, Q2 etc. of either of the two 8-bit latches 59 and 60.

Thus during slowdown, as the length of the pulse on signal SR decreases, fewer latches have high outputs, and fewer speed relays are energized. The dropping-out of these speed relays will generally occur to equal intervals of time except for the last ones where the constant deceleration ceases and the deceleration tapers off.

The circuit of FIG. 8 is disclosed here to show approximately what is required to achieve the results shown in FIGS. 2A and 2B. This, however, is not the preferred embodiment of the invention. The values of q and d obtained from the circuits of FIGS. 4, 5 and 6 are suitable for the preferred embodiment where an analog speed pattern is produced by circuits yet to be described in connection with FIGS. 9, 10, 11 and 12. For the circuit of FIG. 8, larger values of q and d would be required, and although this is not shown on the figures, it involves simple changes which would be obvious to anyone skilled in the art. For steps 1 through $x-1$, it would be appropriate, although not necessary, to retain the amount substracted at each step, which is one cell; this would tend to drop out a speed relay every 2½ inches during the rounding-off near floor level. If coarser steps are desired, some of the outputs of the 8-bit latch 60 could be left unused.

FIG. 9A illustrates the manner in which the "working signal" WS is caused to operate for the purpose of creating a "speed pattern" SP which can be used to dictate the speed of the vehicle. The lower graph shows the waveform of the voltage on signal WS, on a time base, for one complete calculation. The length of time required for one complete calculation might be approximately 16 milliseconds, and possibly 256 steps of calculation might occur in this time.

FIG. 9A also includes the waveforms of five other pertinent signals. During the data entry period, when signal RO is high, the working signal WS is brought down rapidly to a low value corresponding to an adjustable landing speed. The rate at which signal WS is brought down must be sufficiently high to assure that it reaches the desired value before the end of the RO pulse regardless of the starting point.

For the duration of SR pulse, the working signal rises, but not beyond a value corresponding to an adjustable top speed. Two adjustable rates are used for this rise:

1. Steps 1 through $x-1$ when signal nSXM is high.
2. Steps $x$ and higher, when signal nSXM is low.

Two additional signals SRA and SRB are derived from SR. Generally SRA and SRB coincide with SR, but when the working signal has reached a value corresponding to the adjustable top speed, SRA and SRB are made low regardless of signal SR.

In FIG. 9A, a situation is depicted which occurs when the target distance is in excess of the slowdown distance, which can be defined as the distance required to bring the vehicle to a stop from the adjusted top speed using the deceleration rate determined by the adjusted slope of the working signal. In an elevator, this corresponds to the situation existing when the car is running at top speed and the target floor keeps advancing, because no stops are yet required, so as to always be ahead by at least the slowdown distance.

Under these conditions, signals SRA and SRB are terminated early by the working signal reaching top speed, while signal SR remains high for a longer period. A monostable multivibrator is used to create signal nALT which goes low for a brief period immediately at the cessation of the pulse on signal SRA. When signal nALT reverts to the high state at the end of its timing period, the state of signal SR is clocked into a flip-flop.

If signal SR is high at the termination of the nALT pulse, as shown in FIG. 9A, the clocked flip-flop gets set to a state which indicates that the target distance is at least somewhat greater than the slowdown distance. At each new calculation, the flip-flop receives the same data at the clocking point, and hence maintains its state, provided that the target distance, as expressed by the duration of signal SR, does not decrease too much.

As the car continues to move at full speed, however, the point at which signal SR goes low in each calculation travels to the left in FIG. 9A until it reaches a point indicated by the dotted lines. Now, at the termination of the nALT pulse, signal SR is low. This causes the clocked flip-flop to be set to its other state.

This other state of the flip-flop is used to indicate when another advance of the target floor should be made, if no stop is required at the present target floor. The purpose of the nALT timing is to start the advancing sequence slightly early to assure that the car does not start to decrease its speed for the old target floor due to any slight delay in the advancing of the target floor.

After an advance of the target floor, the duration of pulse SR immediately assumes a larger value at the next calculation, and then decreases as the car continues to move nearer to this new target floor.

The arrow 61 in FIG. 9A indicates the value which the speed pattern should have to dictate top speed. A continuous comparison is made between the rapidly changing working signal and the relatively slowly changing speed pattern. If the working signal becomes higher than the speed pattern prior to the arrow in FIG. 9A, it is an indication that the speed pattern is too low. It is then caused to rise at an adjustable rate until the arrow is reached. This generally does not bring the speed pattern up to the desired value, but the process is repeated at each new calculation. As the speed pattern nears agreement with the value of the working signal at the arrow, the time during which the speed pattern is caused to rise becomes shorter because the working signal exceeds the higher speed pattern later. This gives a desirable rounding-off of the rising speed pattern as it nears top speed. This effect also occurs when a stopping sequence is called for while the car is still accelerating.

The proceeding sequence, which causes the speed pattern to increase in value, occurs mostly during the accelerating portion of a trip. During slowdown, a different process is required to bring the speed pattern down as the target distance decreases, while the vehicle approaches and stops at a floor.

FIG. 9B shows the waveform of the working signal when the target distance is less than the slowdown distance. This situation exists during slowdown, and can also exist during acceleration. Compared with FIG. 9A, the working signal in FIG. 9B does not reach as high a value because it is limited by the duration of the pulse on signal SR. Signals SRA and SRB are now identical with SR.

The dotted lines in FIG. 9B show the situation which exists when the target distance is much smaller; now, the working signal rises to a lesser value, and can be brought down in a shorter time from this value when RO goes high.

The arrows 62 and 63 in FIG. 9B show the points where the value of the working signal corresponds to the value which the speed pattern should have. If the speed pattern is too low, the procedure already described causes it to be brought up to the correct level.

If, however, the speed pattern is too high, the procedure for bringing it down starts at the arrows and continues until the speed pattern has been reduced until it equals the working signal which retains the desired value for some time after the arrows. It is desirable to place some restriction on the length of time during which this pulling down of the speed pattern can occur. Otherwise, any failure of components in the calculation of the target distance could cause a too severe reduction in speed pattern.

Generally, when there is no such fault, the speed pattern quickly follows the descending value of the working signal as sampled at the arrows.

When the car is close to being level at the target floor, preferably within one cell away, signal SR has no pulses. When this occurs, the working signal follows a waveform as shown in FIG. 9C which is no longer in synchronism with signal RO. Now, the working signal oscillates between two levels corresponding to up landing speed and down landing speed which are adjustable. A signal FT is created which gives a flat top to the WS waveform in order to permit the use of the same system as before for bringing the speed into alignment with the working signal as sampled at the points indicated by the arrows 64. Signal SRB is caused to change its state when the working signal arrives at a value corresponding to the adjusted up and down landing speeds. Although there is no need to set the up landing speed different from the down landing speed, it is desirable to have separate adjustments in order to make up and down landing speeds equal in spite of inaccuracies and offsets in various operational amplifiers.

It is desirable to use one polarity of speed pattern for one direction of travel, and the opposite polarity for the other direction. For the purpose of this embodiment, the negative polarity will be used for up travel and the positive polarity for down, for the speed pattern. The reverse could just as well have been used. The comparison between speed pattern and working signal is easiest to make, via operational amplifiers, if they are of opposite polarity. Thus, in FIGS. 9A, 9B and 9C the positive polarity which is shown for the working signal represents the up direction; for the down direction, the polarities would be opposite.

The circuits shown in FIG. 10 are mainly for creating signals nWN, WR, WD and WU which are required to cause the working signal to perform as previously described and illustrated in FIG. 9. Other useful signals such as SRA, nSRB and nTSM are also created.

The principal inputs are SR, RO and nSXM from FIGS. 5 and 6, but further inputs are required. Signals U3 and D3 are obtained from FIG. 13 which will be described later; signal U3 is high either because the target floor is above, and thus the car should go up, or because the car is being controlled by constant pressure pushbuttons for maintenance or inspection and the up direction is selected. Signal D3 is similar, but for the down direction. Signal nIN is low for normal operation, and is high only for constant pressure operation during maintenance or inspection. Signal nTFB is low when the target floor is below the car; it is high when the target floor is above the car and also when the car is level at the target floor.

Inputs LSD, LSU and TS are obtained from FIG. 11 and indicate when the working signal is within several adjustable values;

1. TS is high whenever the working signal exceeds an adjustable value corresponding to top speed in either direction;
2. LSU is high whenever the working signal is more positive than the positive adjustable value corresponding to up landing speed; and
3. LSD is high whenever the working signal is more negative than the negative adjustable value corresponding to down landing speed.

A retriggerable monostable multivibrator (MM) 82 is retriggered whenever signal SR goes from low to high, and the timing of this MM must be somewhat greater than the time to complete one calculation. Thus as long as there are pulses on signal SR, the output SRP of MM 82 remains high. When landing speed is required, signal SR remains continuously low and the output of MM 82 quickly returns to the low state and remains there until there are again pulses on signal SR.

A flip-flop consisting of NOR gates 78 and 79 is used to create signal nTSM. The purpose of this flip-flop is to detect when signal TS first goes high to indicate that the working signal has reached a value corresponding to top speed. Signal nTSM goes low whenever TS is high, but in addition, while signal nSXM is low (for most of each calculation) nTSM maintains its low condition after TS goes high in case TS goes low again. This could occur if the integrator which creates the working signal has a tendency to drift slightly when it should be maintaining a steady output. The 78-79 flip-flop is reset when nSXM goes high at the beginning of a calculation.

Signal SRA is derived from AND gate 73. In normal operation, nIN is low and the output of NAND gate 72 is high. Thus signal SRA is equivalent to signal SR until nTSM goes low; then it is low regardless of signal SR. This agrees with FIG. 9A. Inverted signal nSRA is obtained from inverter 96.

When there are pulses on signal SR, MM 82 is continually being retriggered, and its output SRP is continuously high. The output nSRP of inverter 93 is then low, and this makes the output of NAND gate 95 high. AND gate 97 then passes the inverted signal nSRA through the make nSRB equivalent to nSRA.

When there are no pulses on signal SR, nSRP becomes high, and SRA remains low. Now, signal nSRB is obtained from EXCLUSIVE-OR 94, routed through gates 95 and 97. This condition occurs when landing speed is being dictated, and signal nSRB must be controlled in a suitable manner to obtain the operation illustated in FIG. 9C.

A flip-flop consisting of NAND gates 87 and 88 is used to assist in achieving the operation illustrated in FIG. 9C. Input nIN is low for this operation, and thus the outputs of NAND gates 75 and 76 are high. NAND gates 84 and 85 act as inverters to invert signals LSU and LSD and apply them to the flip-flop consisting of gates 87 and 88.

When the working signal rises above equivalence with the adjusted up landing speed, LSU goes high, the output of gate 84 goes low, and flip-flop 87-88 is set to a state where signal X is high and signal nX is low. Later it will be explained that this causes the working signal to stop rising and either immediately or after a delay start to ramp down (i.e. become more negative).

Similarly, when the working signal falls below equivalence with the adjusted down levelling speed, flip-flop 87-88 is set to the opposite condition, where signal X is low and signal nX is high, via gate 85 from input LSD. This stops the ramping down of the working signal and causes it to ramp up either immediately or after a delay.

For the up direction, as illustrated in FIG. 9C, input U3 is high and EXCLUSIVE-OR gate 94 inverts signal X. For the down direction input U3 is low and gate 94 passes signal X without inversion. The purpose of this circuit is to make the end of the pulse on signal SRB occur at the end of the ramp-up part of the waveform of the working signal for up travel and to make the end of said pulse occur at the end of the ramp-down part for down travel. It is the end of the SRB pulse which determines when the working signal has the value which the speed pattern should assume and hold until the end of the succeeding pulse on SRB.

Outputs WD and WU from FIG. 10 are used to control analog circuits in FIG. 11 which cause the working signal to ramp down or to ramp up. Output WD is high to cause a ramp-down; output WU is high to cause a ramp-up. When WD and WU are both low, the working signal holds its previous level.

The fast ramp down when RO goes high, as shown on FIGS. 9A and 9B, is obtained by output WD going high through gates 83 and 89. All three inputs to NAND gate 83 are high and its low output makes the output of gate 89 high. This condition remains until the working signal has ramped down to a value corresponding to up landing speed, when input LSU goes low.

If the working signal has a negative value when RO goes high, it is gates 86 and 92 which operate since input LSU is low and input LSD is high. This makes WU high instead of WD, to ramp the working signal up until it reaches equivalence with down landing speed, and input LSD goes low.

During either of the two preceeding operations where the working signal is brought quickly down to a value corresponding with landing speed, signal RO and SRP are both high and thus the output WR of AND gate 81 is high. This causes circuits on FIG. 11 to force the working signal to change its voltage at the maximum rate.

While signal SRA is high, the working signal is caused to rise by output WU going high for the up direction via gates 74 and 92. Similarly, for the down direction WD is made high via gates 77 and 89. This action continues until SRA goes low either because the working signal has reached equivalence with the adjusted top speed or because the pulse on signal SR had ended.

Initially, during this operation, signal nSXM is high and SRP is also high; this makes output nWN of AND gate 80 high and this causes circuits on FIG. 11 to select from one of two adjustable rates for the ramping action of the working signal. During and after step x, nSXM is low and this makes nWN low to select the other of the two adjustable rates.

FIG. 10 also contains a circuit for controlling output nAL which is required for the purpose of indicating to other circuits, which are not part of this invention, when the target floor has advanced far enough to permit full speed. For example, in my co-pending patent application Ser. No. 728,006, filed Sept. 29, 1976, an input nAL is required. The operation of this circuit has already been partially described in connection with FIG. 9A. At the end of each pulse on signal SRA, output nALT of MM 67 goes briefly low and when it goes high again the clock input CK of clocked flip-flop 68 goes high and thus the information on its data input D, which is signal SR, is remembered internally and available in inverted form on output nQ of the flip-flop, which is named nAL.

If the target floor has advanced far enough ahead to permit full speed, signal SR will be high when flip-flop 68 is clocked, and nAL will be low to indicate that no further advances of the target floor are presently needed. If the target floor has not advanced far enough to permit full speed, signal SR will be low when flip-flop 68 is clocked, and nAL will be high. Other circuits such as, for example, those on FIG. 12A of my co-pending patent application Ser. No. 728,006, filed Sept. 29, 1976, will then cause the target floor to advance to a new floor unless a stop is required at the present target floor.

Normally, EXCLUSIVE-OR gate 65 has no important effect on flip-flop 68 since U3 and nTFB are normally both high together or both low together except briefly when starting and stopping, and then the state of nAL is of no importance. Gate 65 is provided, however, to recognize a condition which can occur if the target floor is below an upbound car, or above a downbound car. This situation can arise when the car is being operated at low speed via constant pressure pushbuttons for maintenance or inspection purposes.

It is desirable to have the target floor advanced during such constant pressure operation in a similar manner to normal operation. This allows automatic slowing down as the car approached either terminal floor. The circuits described here are suitable for such operation. Alternatively, the system described in my co-pending patent application Ser. No. 728,006, filed Sept. 29, 1976, could be used; it causes the target floor to be that floor which is closest to the car, during constant pressure operation.

Assuming that the target floor advances during constant pressure operation in a manner similar to normal full speed operation, and that these advances occur only when the car approaches the point where the target distance is equal to the slowdown distance required for the slow speed at which the car moves during this type of operation, then it can be seen that if the car is stopped just after a target floor advance, and is then moved in the opposite direction, the target floor may be further away than the slowdown distance, although in the wrong direction.

The circuit consisting of MM 67 and FF 68 would, without EXCLUSIVE-OR gate 65, fail to cause target floor advancing under these conditions and the car could move farther and farther from the target floor. Gate 65, however, recognizes this condition and resets FF 68 to cause output nAL to go high to cause notching, and thus get the target floor ahead of the car in the direction of travel.

While the car is being operated by constant pressure pushbuttons for inspection or maintenance, the speed must be held to a low value, typically somewhere around 60 to 100 feet per minute. This is accomplished in FIG. 10 by MM 70 whose timing is preferably made adjustable by components not shown on FIG. 10.

In normal operation the output of MM 70 is not used since input nIN is low, and is connected to all gates, 72, 75 and 76, which use the output of MM 70 or the inverted output of inverter 71. When nIN is high, however, signal SRA has an additional factor via the output of gate 72 which causes signal SRA to cease even earlier than before, when the working signal has reached a value corresponding with the desired low speed. Increasing or decreasing the timing of MM 70 causes an increase or decrease in this speed.

If the car approaches a terminal floor, the decreasing target distance causes the length of the pulses on signal SR to reduce, and thereby slow down the car automatically. If the car is operated during construction before the equipment for measuring target distance is installed, a circuit involving inverter 66 and gates 69, 75 and 76 causes the working signal to operate in a similar manner to landing speed, as shown on FIG. 9C, but with the working signal ramping up or down for a longer period, determined by MM 70, in the direction of travel.

This causes the speed to be adjustable by MM 70, as before, but without the automatic reduction in speed during the approach to a terminal floor.

The purpose of gate 90 is to make the flat top to the waveform of the working signal as shown in FIG. 9C for the up direction. Gate 91 causes a similar flat bottom to the waveform for the down direction which is not illustrated. This applies only to landing speed or constant pressure operation without target distance measurements, as determined by MM 82. The flat top is needed to provide sufficient time to bring the speed pattern into agreement with the appropriate sampling point of the waveform of the working signal before it ramps up or down to the other level.

FIG. 11 contains an integrator consisting of operational amplifier 102, capacitor C1 and optional resistor R43 which, if suitably sized, may reduce the zero-offset error of the operational amplifier. The output of this integrator is the working signal WS.

Three resistors R31, R32, and R33 can be selected by analog switches 107, 108 and 109 to supply current to the integrator. Two analog switches 106 and 110 control the polarity of the current. These analog switches must be capable of handling both polarities; a negative supply line M10 is shown to provide minus 10 volts with respect to grounded supply line OV, while the P10 line provides plus 10 volts with respect to ground. The logic inputs to these analog switches operate between ground (OV) and plus 10 volts only.

Devices are available which permit positive and negative switching of analog signals under the command of logic inputs which are referenced to ground, but they may be limited to plus 5 volts on the logic inputs. The LF13202 device manufactured by National Semiconductor Corp., for example, has this limitation but is otherwise suitable. Therefore resistors R26 through R30 are provided on FIG. 11 to limit the current on the inputs to the analog switches to a value in agreement with the manufacturer's specifications. If other devices are used which do not have this limitation, these resistors can be eliminated.

Also, the aforementioned device has limitations on how close the analog signal can go to the plus and minus power supply voltages. For this reason, voltage dividers are used, such as R37 and R38, to assure that the analog voltages cannot go too close to the power supply lines P10 and M10. These voltage dividers serve an additional purpose in limiting the current through the analog switches if switches 106 and 110 are falsely turned on at the same time.

When signal WD goes high, it causes analog switch 106 to turn on to flow current into the integrator; this makes its output WS ramp down. Similarly, when signal WU goes high, analog switch 110 turns on to flow current out of the integrator which causes its output WS to ramp up.

If signal WR is high, analog switch 107 selects resistor R31 whose resistance is low enough to obtain the desired fast ramping of the output of the integrator. If signal WR is low, signal nWN selects either resistor R32, via gate 104 and analog switch 108 (which occurs when nWN is high) or resistor R33 via inverter 103 and analog switch 109.

When analog switch 108 is turned on, the current to the integrator is adjustable by potentiometer R34 which affects rounding-off at the end of a stopping sequence. When analog switch 109 is turned on, the current into the integrator is adjustable by potentiometer R35 which determines the deceleration rate and the corresponding slowdown distance, as previously described.

Input LLM to FIG. 11 is normally low, and transistor Q1 is turned off. If desired, transistor Q1 can be turned on by making input LLM high, to connect resistor R41 in parallel with resistor R38 to thereby select a lower deceleration rate for the down direction only. A correspondingly greater slowdown distance automatically occurs. This might be used when the car is loaded heavily, where the gentler slowdown reduces the currents handled by the motor and M.G. set.

An operational amplifier 99 is used to control signal TS. When the working signal WS rises to a value more positive than equivalence with top speed up, current flows from WS through diode D5 and forces the "+" input of the operational amplifier 99 to have a more positive voltage than its "−" input. Its output then goes up close to the P10 supply line, and output TS goes high. The voltage at which this occurs is adjustable by potentiometer R12, since diode D4 is reverse biased at this time and thus is not conducting.

Similarly, when the voltage on WS goes down to a value more negative than equivalence with top speed down, the "−" input of the operational amplifier 99 is made more negative, via diode D4, than the "+" input and again the output switches up close to the P10 supply line. The voltage at which this occurs is adjustable by potentiometer R15, since diode D5 is not conducting at this time.

Thus, the top speed is separately adjustable for up and down by potentiometers R12 and R15, respectively. Separate adjustments are shown in FIG. 11 for up and down because it is easier to do so; normally they would be set to equal values. However, if there were any advantage in making them unequal, it could be done, and the slowdown distances would automatically be suitably different for the two directions.

When the voltage on WS is between these two adjustable settings, current flows from P10 through resistor R11, part of potentiometer R12, diodes D4 and D5, part of potentiometer R15, and through resistor R16 to M10. This makes the two inputs of the operational amplifier 99 separated in voltage by two diode drops, or about 1.5 volts, in a polarity which makes its output switch down close to the M10 level. Resistor R17 limits the current into gate 78 on FIG. 10 which, if of the CMOS type, has internal diode protection. Otherwise, gate 78 might be damaged by excessive current.

Two comparators, 100 and 101 are used to control signals LSU and LSD. Comparator 100 has its "−" input connected to potentiometer R19 which is part of a voltage divider between supply lines P10 and 0V. When the working signal becomes more positive than the reference determined by potentiometer R19, the output of comparator 100 goes high to make signal LSU high. Resistor R18 has a much higher resistance than potentiometer R19, so that a relatively small positive voltage on WS causes LSU to go high.

Similarly, signal LSD goes high if the working signal goes more negative than the slightly negative value adjustable by potentiometer R20. Thus potentiometer R19 adjusts the up landing speed and potentiometer R20 adjusts the down landing speed.

It is assumed that comparators 100 and 101 (and similarly comparators 116 and 117 on FIG. 12) are of type similar to quad comparator LM2901 manufactured by National Semiconductor Corp. This type has active pull-down (to minus 10 volts in FIGS. 11 and 12) but no internal pull-up. Thus resistors R22 and R24 are supplied to act as pull-up resistors. Resistors R23 and R25 are also supplied to limit the current in gates 83, 84, 85 and 86 on FIG. 10 when a comparator switches its output down to minus 10 volts.

In FIG. 12, an integrator consisting of operational amplifier 114, capacitor C2 and resistors R51 and R52, is used to control the speed pattern SP. The capacitor C2 has much higher capacitance than capacitor C1 in FIG. 11 because the speed pattern operates in real time, and must not change too rapidly, while the working signal must operate at high speed.

The speed pattern SP is caused to ramp down when signal BU goes high, and to ramp up when BD goes high. The polarity of SP is negative for up and positive for down; this is opposite to the working signal.

When signal BU is high, analog switch 111 is turned on, and this applies a positive voltage to the integrator to make its output ramp down to more negative values. When signal BD is high, analog switch 112 is turned on, and this applies a negative voltage to the integrator to make its output ramp up to more positive values.

Two rates of ramp on the output SP of the integrator are possible. When analog switch 113 is turned on, the maximum rate, determined by resistor R51, is obtained; when analog switch 113 is turned off, an additional resistor R50 is inserted to give a lower, adjustable rate to the ramp on signal SP. Signal BS, which will be described later, controls analog switch 113.

An operational amplifier 115 is used as a comparator to continuously compare the rapidly changing working signal WS with the more slowly changing speed pattern SP. Resistors R53 and R54 can have any suitable ratio of resistances, but for the purpose of this description they are assumed to be equal. Then, whenever the working signal is higher (i.e. more positive) than what the speed pattern would be if of opposite polarity, output nWH of operational amplifier 115 is low. Diode D8 clamps the output to a small negative value, with respect to grounded supply line 0V, rather than permit nWH to become close to minus 10 volts, which might damage gates 118, 122, 124 and 125. Similarly whenever the working signal is lower (i.e. more negative) than what the speed pattern would be if of opposite polarity, output nWH is high and diode D8 has no effect. The speed pattern is opposite in polarity to the working signal for these comparisons.

The circuit for causing the speed pattern SP to become more negative to match the sampling point of the working signal, for the up direction, includes inverter 118, NAND gates 119 and 120, and analog switch 111. If, during the time signal SRB (which is inverted by inverter 98 from signal nSRB) is high, the working signal WS becomes more positive than the speed pattern, signal nWH goes low and the output WH of inverter 118 goes high. This causes the output of gate 119 to go low and this causes the output BU of gate 120 to go high to make analog switch 111 turn on.

This makes the speed pattern ramp down at the lower rate, adjustable by resistor R50, to a more negative value which dictates a higher speed in the up direction. Typically the rate at which the speed pattern changes is such that it does not reach complete agreement with the sampling point of the working signal before the pulse ends on signal SRB. Thus the same process is required again on subsequent calculations and as the speed pattern approaches agreement with the sampling point of the working signal, smaller times are available for causing the speed pattern to ramp down because signal nWH goes low later in the rise of the working signal, nearer to the end of the pulse on signal SRB. This causes the speed pattern to approach its final value exponentially and thus to round off the speed pattern as it approaches top speed or inspection speed, or as it rounds off during a single floor run. This effect can be varied via adjustable resistor R50.

A further restriction on the amount of change on the speed pattern SP for the up direction is obtained from a comparator 116. A voltage divider consisting of resistors R56 and R57 establishes a voltage reference on the "+" input of the comparator. This is compared with an adjustable portion of the voltage obtained from input AP. Resistor R60 adjusts this portion.

Input AP is derived from the speed control system; it should be proportional to the rate of change of generator voltage, if an M.G. set is used, or the acceleration of the vehicle if a suitable method is available for making such measurement. If a speed control system based on my U.S. Pat. No. 3,706,017 is used, the voltage $E_\alpha$ of FIGS. 1 and 9 of this patent is precisely what is required to be applied to input AP of FIG. 12 of the present patent.

If the voltage on input AP rises above a level adjustable by resistor R60, the output of comparator 116 goes low, toward the minus 10 volt supply and resistors R64 and R65 attenuate this to give a logic low signal, near the grounded supply line 0V, to one input of gate 119. This terminates any ramping down of the speed pattern SP.

During upward acceleration, the action of this circuit is to shorten the period in which the speed pattern ramps down slightly at each calculation, to achieve a substantially constant acceleration. Near the end of the acceleration, exponential rounding takes over to limit the repetitive changes to the speed pattern.

This control of the upward acceleration rate, achieved by the circuits of FIG. 12, is an alternative to performing similar operations in the speed control system itself. The advantage of doing it as part of the solid state selector is that it permits a reduction in up acceleration under the same load conditions as were used to limit the down slowdown, as described for transistor Q1 in FIG. 11.

Transistor Q2, in FIG. 12 is assumed to be turned off for normal operation, as just described. When lifting heavy loads, however, transistor Q2 can be turned on by signal LLM to thereby connect resistor R62, which could be adjustable, in parallel with resistor R57. This lowers the reference voltage for comparator 116, and automatically causes a lesser rate of acceleration in the up direction only.

For the down direction, inverter 129 and NAND gates 124 and 123 are used to control the ramping up of the speed pattern to move positive values, to dictate higher down speed. Now, signal nWH is used instead of WH because it is only when the descending working signal has gone more negative than the speed pattern that signal BD should go high to make SP go more positive. Inverter 129 has its output nU3 high for the down direction, and also when zero speed is required; signal U3 is low in both cases.

Comparator 117 operates for the down direction in a manner similar to what comparator 116 does for the up direction. Its reference voltage is determined by a voltage divider consisting of resistors R58 and R59. It is assumed that the voltage on input AP is positive for up acceleration and negative for down acceleration.

The preceeding description applies to the increasing of the speed pattern (i.e. away from zero) which occurs when the speed pattern is lower than the sampling point of the working signal. The circuit for performing the opposite operation, in which the speed pattern is lowered, involves EXCLUSIVE-OR gate 125, clocked flip-flop 126, MM 127, and NAND gates 121 and 122 in addition to gates 120 and 123 which are used for both operations.

Basically, flip-flop 126 is clocked at the end of each pulse on signal SRB, when nSRB goes high. Since the data input D of flip-flop 126 is connected to the positive supply line P10, the output Q of flip-flop 126 goes high at the instant of clocking to make signal BS high. However, the reset input R, if high at the instant of clocking, will prevent this from happening and BS will remain low.

Gate 125 is arranged to recognize when it is necessary to lower the voltage on the speed pattern SP. If, at the instant of clocking flip-flop 126, the working signal does not exceed the speed pattern, signal nWH is high for the up direction when signal U3 is high or signal nWH is low for the down direction when signal U3 is low. Since gate 125 performs the EXCLUSIVE-OR function, either of these conditions causes a low output which permits signal BS to go high when flip-flop 126 is clocked. When the working signal does not exceed the speed pattern, it is an indication that the speed pattern should be lowered.

The polarity of signal nWH indicates which way the speed pattern must go in order to get into agreement with the working signal which remains for a time at the desired level as illustrated in FIGS. 9A, 9B and 9C. If nWH is high, gate 122 has a low output to make BD high; if nWH is low, WH is high and gate 121 makes BU high. In either case, this causes the speed pattern to ramp in the correct direction to reach agreement with the working signal.

Analog switch 113 is turned on when signal BS is high to make the speed pattern move at a considerably greater rate, because resistor R50 is now shorted out, compared with the previously described operation of raising the speed pattern. It is desirable to permit a considerably greater rate here because during slowdown the speed pattern should generally follow the dictation of target distance only, with no possibility of built-in time delays preventing the proper reductions in speed which are required to stop the vehicle correctly with no over-shooting. Generally, it is expected that at each calculation, the speed pattern will have sufficient time to come completely into agreement with the working signal.

However, the time available for bringing the speed pattern into agreement with the working signal varies from a minimum at high speed to a maximum at low speed. If the rate at which that speed pattern can move is made high enough for full speed by the choice of resistor R51 and capacitor C2, a failure of the target floor calculating system, or a failure of the square root calculating system, could cause excessive deceleration as the speed pattern approaches low values.

Therefore, a time limit is placed on this operation of lowering the speed pattern; MM 127 establishes a time window in which such lowering can occur. At the same time that flip-flop 126 is clocked, MM 127 is triggered and its output FT becomes high for a suitable length of time. At the end of that time, signal FT goes low and causes both signals BU and BD to be low via gates 120, 121, 122 and 123.

Signal FT is inverted by inverter 128 to create signal nFT which is required on FIG. 10 to hold the flat top to the waveform of the working signal, as shown on FIG. 9C, for landing speed and also for inspection speed.

The circuits so far described do nothing about pulling the speed pattern down completely to zero, as required to finally bring the vehicle to a stop. Instead, the speed pattern is, for convenience, allowed to hold the value corresponding to down landing speed, when zero speed is required. This is preferable to allowing it to drift to an unpredictable level which might interfere with the next trip. The speed control system is assumed to have an independent means for regulating the speed to zero when required. This can be most simply achieved for disconnecting, with a contact or an analog switch, the SP input to the speed regulator.

FIG. 13 shows some miscellaneous circuits which may be required to use the system of this invention to control a typical elevator. Some communication is required between the circuits which are disclosed in this and my co-pending patent application Ser. No. 728, 006 filed Sept. 29, 1976, and the rest of the elevator circuits. The interface circuits have been kept to a minimum in this disclosure, and consist of inputs GU1, GD1, BK and nIN with a further optional load measuring switch LS, all of which are shown on FIG. 13.

Input nIN is assumed to be low for normal full-speed operation, and high when special low-speed constant pressure operation is required for inspection or maintenance.

Input GU1 is assumed to be high only when the doors are closed in preparation for an up run, and during the up run until the target floor coincides with a floor where a stop is required.

Input GD1 is similar to GU1, but for the down direction. Inputs GU1 and GD1 are both low when it is required that the vehicle slow down and stop at the present target floor.

The preceding description of inputs GU1 and GD1 applies to normal full-speed operation, when input nIN is low. When nIN is high, inputs GU1 and GD1, when both low, cause a brake stop from the low speed associated with inspection and maintenance. Either GU1 or GD1 can be made high to cause the car to start and run at low speed in the selected direction, on constant-pressure operation.

Input BK is assumed to be high either when the brake is actually lifted, or when the brake is about to be energized and all of the usual safety circuits are closed to permit the car to move, even though the brake has not yet been energized. The main purpose of input BK is to assure that, in normal operation, when an emergency stop is made, the speed pattern starts out from zero when the car starts again, rather than having the speed pattern remain at a value determined by the target distance.

Outputs GU and GD are generally equivalent to inputs GU1 and GD1, and are intended to be connected to similarly named inputs on FIG. 12A of my co-pending patent application Ser. No. 728,006 filed Sept. 29, 1976. However, gates 131 and 132 can be used to hold GU or GD low, in spite of GU1 and GD1, when the target floor coincides with the highest or lowest floor served.

If the target floor coincides with the highest floor served, inputs XT and YT are assumed to be both high to make the output of gate 131 low, and to thus make output GU low. Input XT can be connected to any one of outputs X1 through X8 of FIG. 12B of my co-pending patent application Ser. No. 728,006 filed Sept. 29, 1976, and input XT can be connected to any one of outputs Y1 through Y5 to achieve this.

Similarly, inputs XB and YB can be arranged to be both high when the target floor coincides with the lowest floor served. This assures that in spite of failures in other circuits, the target floor cannot advance above the highest floor served or below the lowest floor served.

Diodes D9 and D10 may be used to lower signal nACP for redundancy at terminal floors, in addition to the cards of FIG. 13 in my co-pending patent application Ser. No. 728,006 filed Sept. 29, 1976 as used at terminal floors. This permits these two cards to be removed without losing the ability to stop the target floor at terminal floors; otherwise, with said cards out, the target floor might step into a state representing a floor not served by this elevator.

Outputs U2 and D2 are intended to be amplified by relay drivers to control the usual up and down relays or contactors which are required by most elevators. Contacts on these relays might, for example, energize the brake and strengthen the motor field. These relays, of course, would be also controlled by the various safety circuits to prevent operation when it is not safe. Alternatively, outputs U2 and D2 could enter into solid state circuits.

When input nIN is high, for low-speed constant-pressure operation, gates 135 and 144 are active to control gates 136 and 143, and outputs U2 and D2 are equivalent to inputs GU1 and GD1 respectively.

When input nIN is low for normal operation, the output of inverter 134 is high and gates 137 and 142 take over the control of gates 136 and 143. Now, inputs GU1 and GD1 have no direct control over outputs U2 and D2. Instead, outputs GU and GD determine the direction in which the target floor advances, and this influences input nTFB which comes from FIG. 14B in my co-pending patent application Ser. No. 728,006 filed Sept. 29, 1976.

When the target floor is below the car, inputs nTFB is low and the output of inverter 141 is high. This permits gate 142 to lower one input of gate 143 to make its output D2 high. Thus the down direction is called for when the target floor is below.

When the car is level at the target floor, signal nLV, from FIG. 6, is low and this forces both outputs U2 and D2 to be low. When the target floor is above the car, inputs nTFB and nLV are both high and the output of gate 137 goes low to make output U2 high.

It is very important that outputs U2 and D2 be controlled from nTFB, rather than from inputs GU1 and GD1, during normal operation. Inputs GU1 and GD1 are low during slowdown, but U2 or D2 must remain high until the car stops. Also, the use of inputs nLV and TFB causes output U2 and D2 to control relevelling operations if required due to, for example, cable stretch as the load moves onto or off of the car.

Outputs U3 and D3, which are required on FIGS. 10 and 12, are obtained from AND gates 138 and 140 so that they can be high only when input BK is high. When either U3 or D3 is high, the output of OR gate 139 is high. Thus whenever the car starts, flip-flop 145 is clocked and the state of its data input D is remembered until the next clocking.

A load switch LS can be provided, if desired; it is assumed to be closed whenever the load in the car exceeds some predetermined amount, such as 80% of rated load, for example. If, when the car starts, load switch LS is closed, output LLM goes high and remains high regardless of further opening or closing of switch LS during acceleration and deceleration, until the next start. If, when the car starts, load switch LS is open, output LLM is low and remains low regardless of any closing of switch LS during acceleration or deceleration. As previously described in connection with FIGS. 11 and 12, signal LLM, when high, causes a longer slowdown distance to automatically occur for the down direction, with a corresponding reduction in the deceleration rate, and also a reduction in the up acceleration rate.

This optional feature is often desirable on installations where the equipment is not quite capable of top performance at full load, where the motor current is at a maximum during up acceleration and down deceleration. With conventional mechanical selectors it would be quite difficult and expensive to obtain this feature. The method which is frequently used with conventional selectors is to not allow the car to operate in either direction if loaded beyond its rated capacity, or to permit it to run at reduced speed in both directions, if loaded beyond an adjustable amount.

The above-disclosed embodiments have been described generally for systems in which a motor-generator set is used to control the speed of an elevator via a direct current motor. The invention is in no way limited to such speed control systems, however. The calculation of the square root of target distance, and the production of an analog speed pattern based thereon is basic to any type of speed control, including systems employing SCR's in place of an M.G. set or a variable frequency a.c. motor control. The concepts disclosed herein also apply to any automatic transport system, not just to elevators.

Thus there is provided, in accordance with the present invention, a novel and improved method and apparatus for producing a speed pattern signal for an elevator car or similar vehicle which is movable between a plurality of stopping positions. The system operates to repeatedly calculate the square root of the target distance TD between the present position of the vehicle and a selected stopping position. The result of each calculation is a digital pulse having a pulse-width substantially proportional to the number of calculating steps. This pulse may be utilized to energize conventional motor speed relays, to obtain relay operation similar to that of a mechanical selector in an elevator system. In a preferred embodiment of the invention, however, the pulse is converted to a steady analog voltage which may be applied as a speed pattern to an analog speed regulating system of the vehicle. Conveniently, the digital-to-analog conversion apparatus provides one adjusting device, such as a potentiometer, for simultaneously adjusting the deceleration rate of the vehicle and its slowdown distance, and another adjusting device, such as a potentiometer, for adjusting the round-off deceleration and distance at the end of the stopping sequence.

It will be understood that the above-described embodiments are merely exemplary and that persons skilled in the art may make many variations and modifications thereto without departing from the spirit and scope of the present invention. All such variations and modifications are intended to be included within the scope of the invention as defined in the appended claims.

I claim:

1. A method for controlling the speed of a vehicle movable between a plurality of stopping positions, said method comprising the steps of:
   (a) setting the contents of a main register, designated as a first variable (MR), equal to a digital number representing a target distance (TD) between the present position of the vehicle and a selected stopping position;
   (b) setting the contents of a step counter, designated as a second variable (SC), equal to a digital number representing an initial integer (1, 2, . . . x);
   (c) setting the contents of an auxiliary register, designated as a third variable (XR), equal to a digital number representing a first constant (q);
   (d) digitally subtracting the contents of the auxiliary register, said third variable (XR), from the contents of the main register, said first variable (MR);
   (e) digitally adding a digital number representing a second constant (d) to the contents of said auxiliary register, said third variable (XR);
   (f) incrementing said step counter, and hence said second variable (SC), by one unit;
   (g) determining whether the contents of said main register, said first variable (MR), has been reduced to zero or less;
   (h) if said first variable (MR) is greater than zero, returning to step (d);
   (i) if said first variable (MR) is zero or less than zero, producing a speed pattern signal in the form of a pulse whose width is substantially proportional to the contents of said step counter, said second variable (SC); and
   (j) repeatedly carrying out steps (a)–(i); while
   (k) controlling the vehicle speed in accordance with said speed pattern signal.

2. The method defined in claim 1, wherein said initial integer is a predetermined integer (x), and wherein step (a) includes the step of subtracting a digital number representing a rounding-off distance from the target distance number (TD).

3. The method defined in claim 1,
wherein step (b) includes the step of setting the contents of the step counter, said second variable (SC), equal to a first predetermined integer (1, 2, ... (x−1)) which is less than a second predetermined integer (x);
wherein step (b) further comprises the steps of:
(1) determining whether said second variable (SC) is less than, equal to or greater than said second predetermined integer (x),
(2) if said second variable (SC) is equal to said second predetermined integer (x), proceeding to step (c),
(3) if said second variable (SC) is greater than said second predetermined integer (x), proceeding to step (d), and
(4) if said second variable (SC) is less than said second predetermined integer (x), digitally subtracting a digital number representing a third constant from the contents of said main register, said first variable (MR), and proceeding to step (f); and
wherein step (h) includes the step of returning to step (1) when said first variable (MR) is greater than zero and said second variable (SC) is less than or equal to said second predetermined integer (x).

4. The method defined in claim 3, wherein said third constant is unity.

5. The method defined in claim 3, wherein said second predetermined integer is in the range of 5–12.

6. The method defined in claim 3, wherein said first predetermined integer is 1.

7. The method defined in claim 3, wherein said first predetermined integer is 2.

8. The method defined in claim 1, wherein the sequence of steps is repeated many times per second.

9. The method defined in claim 1, wherein said first constant (q) is chosen to produce substantially constant deceleration during most of the vehicle slowdown period when the vehicle approaches a stopping position.

10. The method defined in claim 1, wherein said second constant (d) is chosen such that step (f) is repeated, at a maximum, 256 times before repeating step (j).

11. The method defined in claim 1, wherein step (i) includes the steps of starting said pulse substantially at the time of execution of step (a) and ending said pulse substantially at the time of execution of step (j).

12. The method defined in claim 1, wherein said vehicle is an elevator car and said stopping positions are floors.

13. Apparatus for controlling the speed of a vehicle movable between a plurality of stopping positions, said apparatus comprising, in combination:
(a) a main register (MR);
(b) means for setting the contents of said main register (MR) equal to a target distance (TD) between the present position of the vehicle and a selected stopping position;
(c) a step counter (SC);
(d) means for setting the contents of said step counter (SC) equal to an initial integer (1, 2, ... x);
(e) an auxiliary register (XR);
(f) means for setting the contents of said auxiliary register (XR) equal to a first constant (q);
(g) means, connected to said auxiliary register (XR) and to said main register (MR), for subtracting the contents of said auxiliary register (XR) from the contents of said main register (MR);
(h) means for adding a second constant (d) to the contents of said auxiliary register (XR) after a subtraction;
(i) means for incrementing said step counter (SC) by one unit after a subtraction;
(j) first decision means for determining whether the contents of said main register (MR) have been reduced to zero or less;
(k) means, responsive to said first decision means, for producing a speed pattern signal substantially proportional to the contents of said step counter (SC) when the contents of said main register (MR) are reduced to zero or less than zero; and
(l) means for controlling the vehicle speed in accordance with said speed pattern signal.

14. The apparatus defined in claim 13, wherein said initial integer is a predetermined integer (x), and wherein means (b) includes means for subtracting a rounding-off distance from the target distance (TD).

15. The apparatus defined in claim 13, wherein means (d) includes means for setting the contents of said step counter (SC) equal to a first predetermined integer (1, 2, ... (x−1)) which is less than a second predetermined integer (x);
wherein said apparatus further comprises:
(1) second decision means for determining whether the contents of said step counter (SC) are less than said second predetermined integer (x); and
(2) means for subtracting a third constant from the contents of said main register (MR) when the contents of said step counter (SC) are less than said second predetermined integer (x)
whereby said third constant is repetitively subtracted from said main register (MR) until the contents of said step counter (SC) are incremented to (x).

16. The apparatus defined in claim 15, wherein said third constant is unity.

17. The apparatus defined in claim 15, wherein said second predetermined integer is in the range of 5–12.

18. The apparatus defined in claim 15, wherein said first predetermined integer is 1.

19. The apparatus defined in claim 15, wherein said first predetermined integer is 2.

20. The apparatus defined in claim 13, wherein said speed pattern signal producing means (k) include means for producing a pulse having a pulse-width substantially proportional to the contents of said step counter (SC) when the contents of said main register (MR) are reduced to zero or less than zero.

21. The apparatus defined in claim 20, wherein said speed pattern signal producing means (k) include means for starting said pulse substantially at the time when said step counter (SC) is set to said initial integer, and ending said pulse substantially at the time when the contents of said main register (MR) are reduced to zero or less than zero.

22. The apparatus defined in claim 13, wherein said controlling means (1) includes means, responsive to said speed pattern signal producing means (k) for actuating a plurality of speed control relays in dependence upon said speed pattern signal.

23. The apparatus defined in claim 22, wherein said second constant (d) is chosen such that said step counter is incremented, at a maximum, the number of times equal to the number of speed control relays, before the contents of the main register (MR) are reduced to zero or less than zero.

24. The apparatus defined in claim 13, wherein said second constant (d) is chosen such that said step counter is incremented, at a maximum, 256 times before the contents of the main register (MR) are reduced to zero or less than zero.

25. The apparatus defined in claim 13, wherein said first constant (q) is chosen to produce substantially constant deceleration during most of the vehicle slowdown period when the vehicle approaches a stopping position.

26. The apparatus defined in claim 13, wherein said vehicle is an elevator car and said stopping positions are floors.

27. Apparatus for controlling the speed of a vehicle movable between a plurality of stopping positions, said apparatus comprising, in combination:
 (a) means for generating a digital pulse (SR) having a pulse-width substantially proportional to the speed pattern of the vehicle;
 (b) first signal source means for producing a constant first signal of adjustable magnitude;
 (c) first switch means, connected to said first signal source means and responsive to said pulse generating means, for passing said first signal during at least a portion of the duration of said digital pulse;
 (d) signal integrator means, connected to said first switch means, for producing a working signal proportional to the integral of said first signal;
 (e) sample and hold means, connected to said signal integrator means, for producing an output signal proportional to the maximum value attained by said working signal during the continuance of said digital pulse; and
 (f) means for controlling the vehicle speed in accordance with said output signal.

28. The apparatus defined in claim 27, wherein said vehicle is an elevator car and said stopping positions are floors.

29. The apparatus defined in claim 27, wherein said pulse generating means include means for repetitively generating said digital pulse, whereby said signal integrator means repetitively integrates said first signal.

30. The apparatus defined in claim 27, wherein said first signal source means include a potentiometer for adjusting said constant first signal.

31. The apparatus defined in claim 27, wherein said first signal source means include a current source and said constant first signal is a constant first current.

32. The apparatus defined in claim 27, further comprising second signal source means for producing a constant second signal of adjustable magnitude; and second switch means, connected between said second signal source means and said signal integrator means and responsive to said pulse generating means, for passing said second signal to said signal integrator means during a portion of the duration of said digital pulse.

33. The apparatus defined in claim 32, wherein said first switch means passes said first signal during a first portion and second switch means passes said second signal during a second portion of the duration of said digital pulse, and wherein said first and second portions of said pulse are mutually exclusive.

34. The apparatus defined in claim 33, wherein said second portion precedes said first portion in time.

35. The apparatus defined in claim 32, wherein said second signal source means include a potentiometer for adjusting said constant second signal.

36. The apparatus defined in claim 32, wherein said second signal source means include a current source and said constant second signal is a constant second current.

37. The apparatus defined in claim 32, wherein said vehicle is movable in opposite directions between said stopping positions; and wherein said first and second signals are positive for one direction and negative for the opposite direction of motion.

38. The apparatus defined in claim 27, further comprising means, connected to said signal integrator means and responsive to said pulse generating means, for setting said working signal to a prescribed value proportional to the landing speed of the vehicle at the commencement of said digital pulse.

39. The apparatus defined in claim 38, wherein said prescribed value is adjustable.

40. The apparatus defined in claim 38, wherein said vehicle is movable in opposite directions between said stopping positions; and wherein said working signal setting means includes means for setting said working signal to a positive prescribed value proportional to the landing speed for one direction and to a negative prescribed value proportional to the landing speed for the opposite direction of motion.

41. The apparatus defined in claim 40, wherein said positive prescribed value and said negative prescribed value are independently adjustable.

42. The apparatus defined in claim 40, wherein said working signal setting means includes means for causing said working signal to oscillate between said positive and negative prescribed values when said vehicle is at a standstill at a stopping position.

43. The apparatus defined in claim 27, wherein said vehicle is movable in opposite directions between said stopping positions; and wherein said first signal is positive for one direction and negative for the opposite direction of motion.

44. A method for controlling the speed of a vehicle movable between a plurality of stopping positions, said method comprising the steps of:
 (a) receiving a first digital signal representative of the target distance between the present position of the vehicle and the nearest selected stopping position in the direction of vehicle travel;
 (b) calculating the speed pattern for said vehicle from said target distance;
 (c) producing a second digital signal representative of said speed pattern;
 (d) converting said second digital signal to an analog signal representative of said speed pattern; and
 (e) controlling the vehicle speed in accordance with said analog signal.

45. The method defined in claim 44, wherein steps (a)-(d) are carried out repeatedly.

46. The method defined in claim 45,
wherein said converting step (d) includes the steps of:
 (1) converting said second digital signal to an intermediate analog signal,
 (2) storing said intermediate analog signal, and
 (3) producing a continuous analog output signal representative of the stored signal value during the time that steps (a)-(d) are next repeated.

47. The method defined in claim 44, wherein the calculating step (b) includes the method of:
 (1) setting the contents of a main register, designated as a first variable (MR), equal to a digital number representing a target distance (TD) between the present position of the vehicle and a selected stopping position;
(2) setting the contents of a step counter, designated as a second variable (SC), equal to a digital number representing an initial integer (1, 2, . . . x);
(3) setting the contents of an auxiliary register, designated as a third variable (XR), equal to a digital number representing a first constant (q);
(4) digitally subtracting the contents of the auxiliary register, said third variable (XR), from the contents of the main register, said first variable (MR);
(5) digitally adding a digital number representing a second constant (d) to the contents of said auxiliary register, said third variable (XR);
(6) incrementing said step counter, and hence said second variable (SC), by one unit;
(7) determining whether the content of said main register, said first variable (MR), has been reduced to zero or less;
(8) if said first variable (MR) is greater than zero, returning to step (d);
(9) if said first variable (MR) is zero or less than zero, setting the speed pattern substantially proportional to said second variable (SC); and
(10) repeatedly carrying out steps (a)–(i).

48. The method defined in claim 44, wherein said second digital signal is a digital pulse having a pulse width substantially proportional to said speed pattern.

49. The method defined in claim 48, wherein said converting step (d) includes the steps of:
(1) producing a constant first signal of adjustable magnitude;
(2) integrating said first signal during at least a first portion of the duration of said digital pulse;
(3) producing a working signal substantially proportional to the result of the integration; and
(4) producing an output signal proportional to the maximum value attained by said working signal during the continuance of said digital pulse.

50. The method defined in claim 49, wherein said converting step (d) further comprises the steps of:
(5) producing a constant second signal of adjustable magnitude; and
(6) integrating said second signal during a second portion of the duration of said digital pulse, said first and second portions of said digital pulse being mutually exclusive.

51. Apparatus for controlling the speed of a vehicle movable between a plurality of stopping positions, said apparatus comprising, in combination:
(a) digital calculator means, responsive to a first digital signal representative of the target distance between the present position of the vehicle and the nearest selected stopping position of the direction of vehicle travel, for calculating the speed pattern of the vehicle and producing a second digital signal representative of said speed pattern;
(b) digital-to-analog conversion means for converting said second digital signal to an analog signal representative of said speed pattern; and
(c) means for controlling the vehicle speed in accordance with said analog signal.

52. The apparatus defined in claim 51, wherein said calculator means is responsive to the repeated application of said first digital signal to repeatedly calculate said speed pattern and produce said second digital signal representative of said speed pattern.

53. The apparatus defined in claim 52, wherein said conversion means includes:
(1) means for converting said second digital signal to an intermediate analog signal;
(2) sample-and-hold means for storing said intermediate analog signal upon completion of each calculation; and
(3) means for producing a continuous analog output signal representative of the stored value during the next subsequent calculation.

54. The apparatus defined in claim 51, wherein said calculator means comprises, in combination:
(1) a main register (MR);
(2) means for setting the contents of said main register (MR) equal to a target distance (TD) between the present position of the vehicle and a selected stopping position;
(3) a step counter (SC);
(4) means for setting the contents of said step counter (SC) equal to an initial integer (1, 2, . . . x);
(5) an auxiliary register (XR);
(6) means for setting the contents of said auxiliary register (XR) equal to a first constant (q);
(7) means, connected to said auxiliary register (XR) and to said main register (MR), for subtracting the contents of said auxiliary register (XR) from the contents of said main register (MR);
(8) means for adding a second constant (d) to the contents of said auxiliary register (XR) after a subtraction;
(9) means for incrementing said step counter (SC) by one unit after a subtraction;
(10) first decision means for determining whether the contents of said main register (MR) have been reduced to zero or less than zero;
(11) means, responsive to said first decision means, for producing a speed pattern signal substantially proportional to the contents of said step counter (SC) when the contents of said main register (MR) are reduced to zero or less than zero.

55. The apparatus defined in claim 51, wherein said second digital signal is a digital pulse having a pulse width substantially proportional to said speed pattern.

56. The apparatus defined in claim 55, wherein said conversion means includes:
(1) first signal source means for producing a constant first signal of adjustable magnitude;
(2) first switch means, connected to said first signal source means and responsive to said digital pulse, for passing said first signal during at least a first portion of the duration of said digital pulse;
(3) signal integrator means, connected to said first switch means, for producing a working signal proportional to the integral of said first signal; and
(4) sample-and-hold means, connected to said signal integrator means, for producing an output signal proportional to the maximum value attained by said working signal during the continuance of said digital pulse.

57. The apparatus defined in claim 56, wherein said conversion means further comprises second signal source means for producing a constant second signal of adjustable magnitude; and second switch means, connected between said second signal source means and said signal integrator means and responsive to said digital pulse, for passing said second signal to said signal integrator means during a second portion of the duration of said digital pulse, said first and second portions being mutually exclusive.

* * * * *